United States Patent
Kim et al.

(10) Patent No.: US 9,304,361 B2
(45) Date of Patent: Apr. 5, 2016

(54) DISPLAY SUBSTRATE AND METHOD OF MANUFACTURING THE SAME

(71) Applicant: Samsung Display Co., LTD., Yongin, Gyeonggi-Do (KR)

(72) Inventors: Joong-Tae Kim, Icheon-si (KR); Kwang-Jae Kim, Asan-si (KR); Hyun-Woong Baek, Seoul (KR); Yong-Chan Jeon, Ulsan (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/563,711

(22) Filed: Dec. 8, 2014

(65) Prior Publication Data

US 2015/0168771 A1 Jun. 18, 2015

(30) Foreign Application Priority Data

Dec. 16, 2013 (KR) .................. 10-2013-0156174

(51) Int. Cl.
*G02F 1/1333* (2006.01)
*G02F 1/1339* (2006.01)
*G02F 1/1341* (2006.01)
*G02F 1/1362* (2006.01)

(52) U.S. Cl.
CPC ............ *G02F 1/1339* (2013.01); *G02F 1/1341* (2013.01); *G02F 1/136204* (2013.01); *G02F 1/136286* (2013.01)

(58) Field of Classification Search
CPC ....... G02F 1/13; G02F 1/1368; G02F 1/1339; G02F 1/1335; H01L 27/3244; H01L 27/3246; H01L 27/3248; H01L 27/3253; H01L 27/3262; H01L 27/3206; H01L 27/3211; H01L 27/3213; H01L 27/3216; H01L 27/318; H01L 27/322
USPC ...................................... 257/59, 72
See application file for complete search history.

(56) References Cited

U.S. PATENT DOCUMENTS

| | | |
|---|---|---|
| 2011/0297645 A1 | 12/2011 | Miyata |
| 2012/0153292 A1 | 6/2012 | Nakamura et al. |
| 2012/0194494 A1* | 8/2012 | Jung ................. G02F 1/133723 345/208 |
| 2013/0101755 A1 | 4/2013 | Lee et al. |
| 2013/0168648 A1* | 7/2013 | Jeong .................. H01L 27/3225 257/40 |

FOREIGN PATENT DOCUMENTS

| | | |
|---|---|---|
| JP | 2005-078869 | 3/2005 |
| JP | 2010-181483 | 8/2010 |
| KR | 1020070057476 A | 6/2007 |
| KR | 1020090100952 A | 9/2009 |
| KR | 1020120026316 A | 3/2012 |

* cited by examiner

*Primary Examiner* — Selim Ahmed
(74) *Attorney, Agent, or Firm* — Innovation Counsel LLP

(57) ABSTRACT

A display substrate includes a first display substrate comprising a display area having an array of switching elements and a peripheral area surrounding the display area, a second display substrate facing the first display substrate, a color filter disposed on the display area of the first display substrate, a first backflow-blocking pattern including a material substantially the same as the color filter and disposed on the peripheral area and an insulation layer covering the color filter and the first backflow-blocking pattern, the insulation layer having a hole exposing, for outgas testing purposes, a corresponding portion of the first backflow-blocking pattern.

20 Claims, 22 Drawing Sheets

DISPLAY SUBSTRATE AND METHOD OF MANUFACTURING THE SAME

PRIORITY STATEMENT

This application claims priority under 35 U.S.C. §119 to Korean Patent Application No. 10-2013-0156174, filed on Dec. 16, 2013 in the Korean Intellectual Property Office KIPO, the contents of which application are herein incorporated by reference in their entireties.

BACKGROUND

1. Field

The present disclosure of inventive concept(s) relates to a display substrate and a method of manufacturing the display substrate. More particularly, the present disclosure relates to a display substrate used for a display apparatus and a method of manufacturing the display substrate.

2. Description of Related Technology

A liquid crystal display (LCD) apparatus typically includes a thin-film transistors (TFTs) substrate, a spaced apart color filter substrate facing the TFTs substrate, and a liquid crystal layer interposed between the TFTs substrate and the color filter substrate.

The TFTs substrate typically includes signal lines formed on an insulation substrate, a plurality of TFTs, TFT-controlled pixel electrodes, etc., in order to independently drive a corresponding plurality of pixels. The color filter substrate typically includes one or more color filter layers including for example red color filters, green color filters and blue color filters, and/or a common electrode facing the pixel electrodes of the TFTs substrate.

Recently, in order to prevent a decrease in image quality due to misalignment between the TFTs substrate and the filters of color filter substrate, a differently structured LCD apparatus has been introduced having a color filter on array (COA) structure in which the color filters are formed on the TFTs substrate.

The TFTs substrate having such a COA structure may include an inorganic insulation layer formed to cover the color filter layer in order to prevent harmful chemicals (e.g., outgassed ones) from flowing out of the COA color filters layer and contaminating other parts of the TFTs substrate.

When an inorganic insulation layer that is harder (e.g., more rigid) than the COA type color filter layer is formed on the color filter layer, the compressibility of the color filter layer corresponding to a contact portion of a corresponding color spacer (one that can define cell gap) may be decreased. Thus, the uniformity of cell gap and the spreadability of liquid crystal molecules may be decreased, so that portions in which the liquid crystal molecules are not filled up during manufacture may be generated.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of inventive concepts provides a display substrate of a Liquid Crystal Display (LCD) capable of decreasing outgas generated faults in the LCD.

The present disclosure also provides a method of manufacturing the above-mentioned display substrate.

In an exemplary embodiment of a display substrate according to the present teachings, the display substrate includes a first display substrate comprising a display area having an array of switching elements and a peripheral area surrounding the display area, a second display substrate facing the first display substrate, a color filter disposed on the display area of the first display substrate, a first backflow-blocking pattern including a material substantially the same as the color filter and disposed on the peripheral area and an insulation layer covering the color filter and the first backflow-blocking pattern, the insulation layer having a hole exposing a portion of the first backflow-blocking pattern.

In an exemplary embodiment, the color filter may include a first color filter pattern including a color photoresist material of a red pigment, a second color filter pattern including a color photoresist material of a green pigment and a third color filter pattern including a color photoresist material of a blue pigment.

In an exemplary embodiment, the first display substrate further comprises a seal-line area surrounding the peripheral area. The display substrate may further include a second backflow-blocking pattern disposed on the seal-line area.

In an exemplary embodiment, the first backflow-blocking pattern and the second backflow-blocking pattern may include a material substantially the same as the color filter.

In an exemplary embodiment, a width of the hole may be smaller than a width of the first backflow-blocking pattern and a width of the second backflow-blocking pattern.

In an exemplary embodiment, the first backflow-blocking pattern may have a closed curve shape surrounding the display area. The second backflow-blocking pattern may have a closed curve shape surrounding the peripheral area.

In an exemplary embodiment, the first backflow-blocking pattern and the second backflow-blocking pattern may include a first sub backflow-blocking pattern and a second sub backflow-blocking pattern parallel to the first sub backflow-blocking pattern.

In an exemplary embodiment, the first sub backflow-blocking pattern may include a material substantially the same as the first color filter pattern. The second sub backflow-blocking pattern may include a material substantially the same as the third color filter pattern.

In an exemplary embodiment, a width of the hole may be smaller than a width of the first sub backflow-blocking pattern and a width of the second sub backflow-blocking pattern.

In an exemplary embodiment, the first display substrate may further include a pixel electrode disposed on the color filter and electrically connected to the switching element.

In an exemplary embodiment, the display substrate may further include an alignment layer disposed on the pixel electrode.

In an exemplary embodiment, the second display substrate may further include a peripheral area surrounding a display area. The display substrate may further include a light-blocking member disposed on the display area and the peripheral area of the second display substrate to block light.

In an exemplary embodiment of a method of manufacturing a display substrate according to the present inventive concept, the method includes forming an array of switching elements on a display area of a base substrate, forming a color filter disposed on the array of the switching elements and a first backflow-blocking pattern disposed on a peripheral area surrounding the display area, forming an insulation layer covering the first backflow-blocking pattern, the insulation layer having a hole exposing a portion of the first backflow-blocking pattern and forming a pixel electrode on the insulation layer.

In an exemplary embodiment, the forming the color filter may include forming a first color filter pattern including a color photoresist material of a red pigment, forming a second color filter pattern including a color photoresist material of a green pigment and forming a third color filter pattern including a color photoresist material of a blue pigment.

In an exemplary embodiment, the base substrate may further include a seal-line area surrounding the peripheral area. The method may further include forming a second backflow-blocking pattern on the seal-line area.

In an exemplary embodiment, the first backflow-blocking pattern may have a closed curve shape surrounding the display area. The second backflow-blocking pattern may have a closed curve shape surrounding the peripheral area.

In an exemplary embodiment, the first backflow-blocking pattern and the second backflow-blocking pattern may include a first sub backflow-blocking pattern and a second sub backflow-blocking pattern parallel to the first sub backflow-blocking pattern.

In an exemplary embodiment, the first sub backflow-blocking pattern may include a material substantially the same as the first color filter pattern. The second sub backflow-blocking pattern may include a material substantially the same as the third color filter pattern.

In an exemplary embodiment, a width of the hole may be smaller than a width of the first sub backflow-blocking pattern and a width of the second sub backflow-blocking pattern.

In an exemplary embodiment, the method may further include forming an alignment layer on the pixel electrode.

According to the presently disclosed inventive concepts as explained above, an insulation layer formed on a backflow-blocking pattern has a hole. The hole may be used for testing for outgas conditions and corrective actions may then be taken Thus, if a gas is leaked through the hole formed on the backflow-blocking pattern and corrective actions are taken before filling liquid crystal molecules, portions in which the liquid crystal molecules are not filled up may not be generated.

BRIEF DESCRIPTION OF THE DRAWINGS

The above and other features and advantages of the present disclosure of invention will become more apparent by describing in detailed exemplary embodiments thereof with reference to the accompanying drawings, in which.

DETAILED DESCRIPTION

Hereinafter, the present disclosure of inventive concept(s) will be explained in detail with reference to the accompanying drawings.

Figure 1:
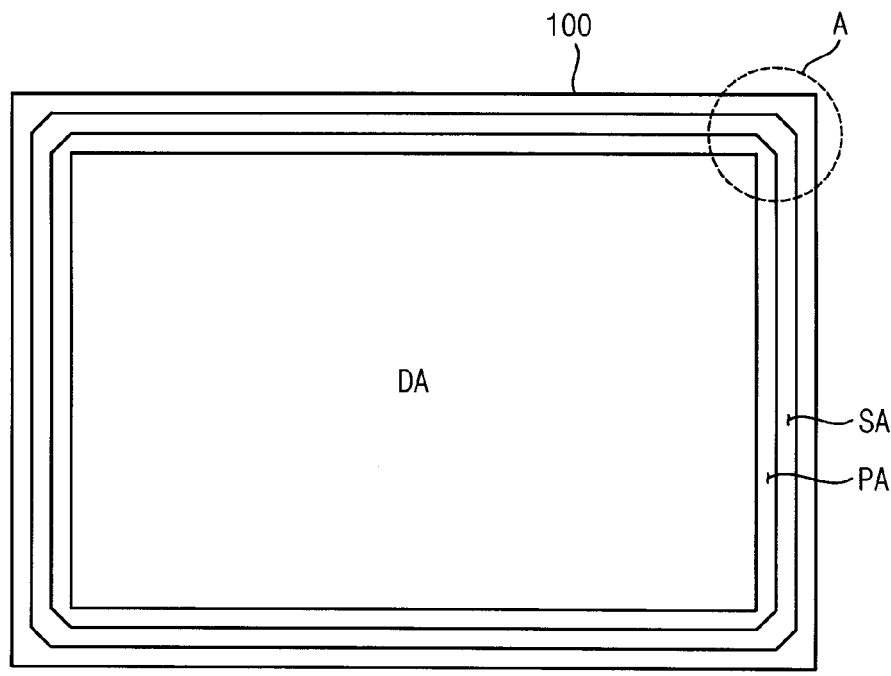
FIG. 1 is a top plan view illustrating an exemplary embodiment of a display substrate according to the present teachings.
Figure 2:
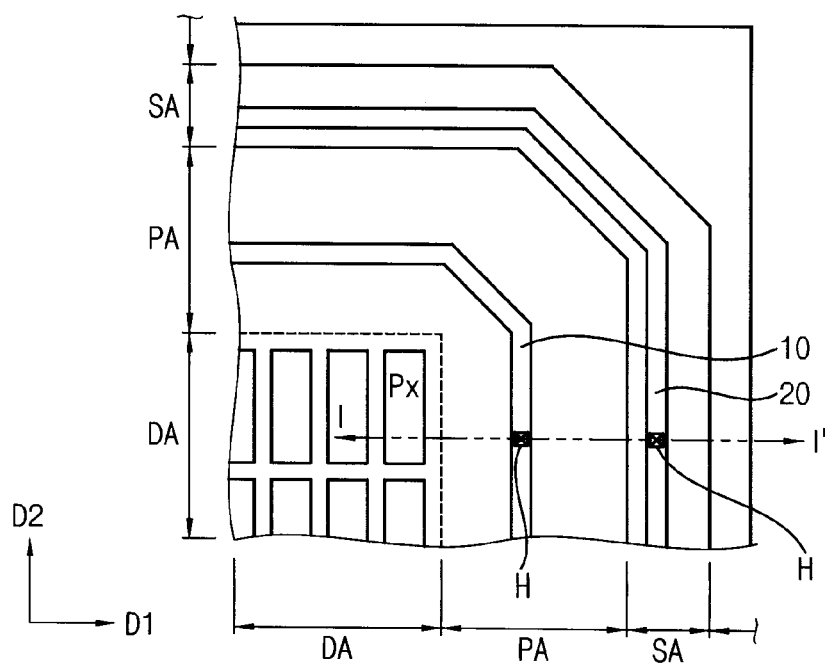
FIG. 2 is a top plan view magnifying a portion A of FIG. 1.

FIG. 1 is a top plan view illustrating a first exemplary embodiment of a display substrate according to the present disclosure. FIG. 2 is a top plan view magnifying a representative portion A of FIG. 1.

Referring to FIGS. 1 and 2, a display panel 501 includes a display area DA, a non-displaying peripheral area PA outside and adjacent to the display area DA and a seal-line forming area SA fully surrounding the peripheral area PA.

The display panel 501 has a generally quadrilateral shape including four sides connected to each other. A point at which two of the four sides intersect with one another defines as a corresponding outer vertex of the display panel 501. The display area DA and the display panel 501 may be similar in shape and proportions. In other words, the display area DA may have a similar generally quadrilateral shape.

Between the outer vertex of the display panel 501 and the corresponding vertex of the display area DA, a number of chamfered features may be provided. More specifically, a first backflow-blocking pattern 10 (BFBP-10) may be formed in the peripheral area PA and relatively close to the display area DA. The first backflow-blocking pattern 10 may be formed of the same layer and/or materials as used for forming COA type color filters disposed in the display area DA. When a red color filter, a green color filter and a blue color filter are formed in the display area DA, the first backflow-blocking pattern 10 may include substantially the same material as used for the blue color filter. However, the first backflow-blocking pattern 10 is not limited thereto. The first backflow-blocking pattern 10 may have a multilayered structure including at least two color layers of substantially the same materials as used for the red, green and blue color filters. For example, the first backflow-blocking pattern 10 may include the multilayered structure such as a double layered structure or a triple layered structure.

Another of the chamfered features may be provided in the form of a second backflow-blocking pattern 20 (BFBP-20) may be formed in the seal-line forming area SA. The second backflow-blocking pattern 20 may be formed of the same layers and/or materials as used for a color filter disposed in the display area DA. When a red color filter, a green color filter and a blue color filter are formed in the display area DA, the second backflow-blocking pattern 20 may include substantially the same material(s) as that of the blue color filter. However, the second backflow-blocking pattern 20 is not limited thereto. The second backflow-blocking pattern 20 may have a multilayered structure including at least two color layers of substantially the same materials as those of the red, green and blue color filters. For example, the second backflow-blocking pattern 20 may include the multilayered structure such as a double layered structure or a triple layered structure.

Figure 3:
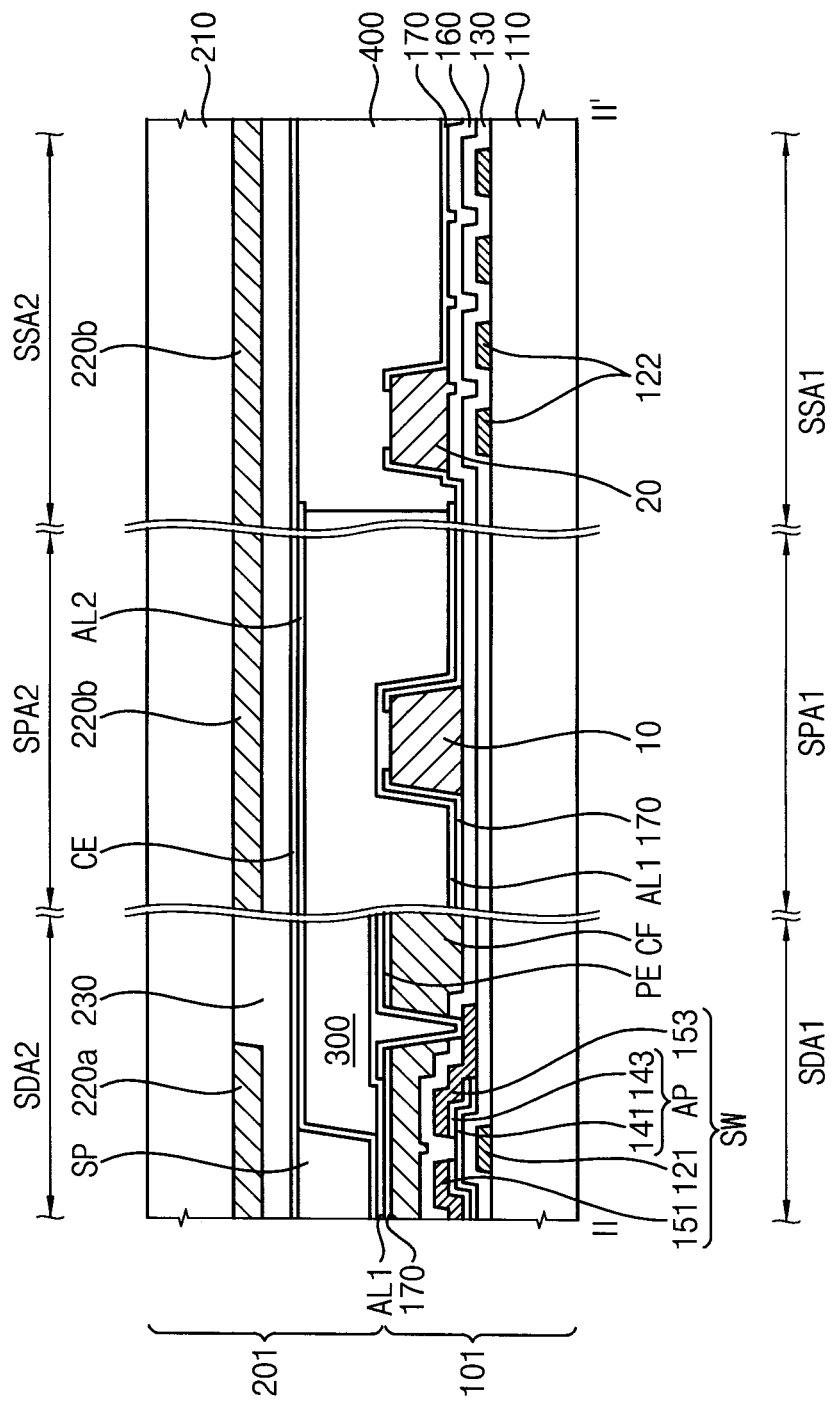
FIG. 3 is a cross-sectional view taken along line I-I' of FIG. 2.

FIG. 3 is a cross-sectional view taken along line I-I' of FIG. 2 where that line I-I' cuts through hole H features of FIG. 2.

Referring to FIG. 3, the display substrate 501 includes a first display substrate 101, a second display substrate 201 sealingly bonded to the first display substrate, a liquid crystal material layer 300 disposed in the display area and fully surrounded by and thus sealed in at least by a sealing member 400. The sealing member 400 operates to bond together the first display substrate 101 with the second display substrate 201, and to seal in the liquid crystal layer 300 between the first and second display substrates 101 and 201.

A first base substrate 110 of the first display substrate 101 includes a first display area SDA1 (where here, Sxx1 indicates the first substrate and the "xx" in this first example is DA) corresponding to the display area DA shown FIGS. 1 and 2. Additionally, the first base substrate 110 comprises a first peripheral area SPA1 corresponding to the peripheral area PA and a first seal-line area SSA1 corresponding to the seal-line forming area SA. A second base substrate 210 of the second display substrate 201 includes a second display area SDA2 facing the first display area SDA1, a second peripheral area SPA2 facing the first peripheral area SPA1 and a second seal-line area SSA2 facing the first seal-line area SSA1. For example, the first and second display areas SDA1 and SDA2 overlap with each other to define the display area DA of the display panel 501, the first and second peripheral areas SPA1 and SPA2 overlap with each other to define the peripheral area PA, and the first and second seal-line areas SSA1 and SSA2 overlap with each other to define the seal-line forming area SA.

The first backflow-blocking pattern 10 (BFBP-10) and a second backflow-blocking pattern 20 (BFBP-20) are formed on the first base substrate 110. For example, the first display substrate 101 includes the first backflow-blocking pattern 10 and the second backflow-blocking pattern 20 formed in the first peripheral area SPA1. In addition, the sealing member 400 is interposed in the Z-direction between and bonds together the first and second seal-line areas SSA1 and SSA2.

The first display substrate 101 includes a first alignment layer AL1 uniformly formed in the first display area SDA1 and the first peripheral area SPA1 and bounded by the second backflow-blocking pattern 20. The first display substrate 101 further includes a switching element SW, the color filter CF and the pixel electrode PE which are formed in the first display area SDA1, and a metal pattern 122 formed in the first peripheral area SPA1 of same conductive materials as used for the gate electrode of the switching element SW and thus referred to herein as a gate metal pattern 122.

The switching element SW includes a gate electrode 121, an active pattern AP, a source electrode 151 and a drain electrode 153. The gate electrode 121 is connected to a gate line (not shown) extending along the first direction D1 of the first display area SDA1. A cross-sectional structure of the gate line is substantially the same as the gate electrode 121, meaning that the gate line (not shown) shares a same layer and is made of same materials as those of the gate electrode 121. The active pattern AP is formed on a first insulation layer 130 which is formed on the gate electrode 121. The active pattern AP includes a semiconductive layer 141 substantially functioning as an electronically-controlled channel of the switching element SW and an ohmic contact layer 143 optionally formed on the semiconductive layer 141. The source electrode 151 is connected to a data line (not shown) extending along the second direction D2 and crossing the gate line. A cross-sectional structure of the data line is substantially the same as the source electrode 151. The drain electrode 153 is spaced apart from the source electrode 151.

The color filter CF may be formed in the first display area SDA1. The color filter CF may cover the switching element SW. The color filter CF is formed on a second insulation layer 160 covering the source and drain electrodes 151 and 153.

The second insulation layer 160 may be omitted, and not be formed on the first base substrate 110.

A third insulation layer 170 may be further formed on the color filter CF. The third insulation layer 170 covers the color filter CF to protect the color filter CF and prevent the color filter CF from being loosed or having its materials leached out or outgassed into the surrounding regions. In addition, the third insulation layer 170 may planarize (render flat) an upper surface of the color filter CF. For example, the third insulation layer 170 may include a silicon nitride or a silicon oxide, and a refractive index of the third insulation layer 170 may be about 1.7 to about 2.1.

The gate metal pattern 122 includes substantially the same metal(s) and occupies the same layer as that of the gate electrode 121. The gate metal pattern 122 may be an antistatic pattern structured for preventing a static electricity from being flowed into the first display area SDA1 and/or it may define signal line patterns structured for applying driving signals and/or control signals to the first display area SDA1. The gate metal pattern 122 is covered by the first insulation layer 130 and the second insulation layer 160.

The first backflow-blocking pattern 10 may be formed in the first peripheral area SPA1. The height of the first backflow-blocking pattern 10 is substantially the same as that of the color filter CF. Alternatively, the height of the first backflow-blocking pattern 10 may be higher than that of the color filter CF. The first backflow-blocking pattern 10 includes substantially the same application and occupies the same layer as that of the color filter CF. When a red color filter, a green color filter and a blue color filter are formed on the first display substrate 101, the first backflow-blocking pattern 10 may include substantially the same material as that of the blue color filter.

The third insulation layer 170 may be further formed on the first backflow-blocking pattern 10. The third insulation layer 170 covers the first backflow-blocking pattern 10 in substantially most areas thereof to protect the first backflow-blocking pattern 10 and prevent the first backflow-blocking pattern 10 from being loosed. In addition, the third insulation layer 170 may planarize an upper surface of the first backflow-blocking pattern 10. For example, the third insulation layer 170 may include a silicon nitride or a silicon oxide, and a refractive index of the third insulation layer 170 may be about 1.7 to about 2.1.

The third insulation layer 170 formed on the first backflow-blocking pattern 10 may have at least one through hole H extending through the BFBP-10 and thereby communicating with (exposing) a portion of the first backflow-blocking pattern 10. The first backflow-blocking pattern 10 may include substantially the same material(s) as those of the color filter CF. Under certain conditions, a noncondensible gas may be leaked (e.g., outgassed) from the color filter CF (from the material used to form the CF) to thereby create a gas bubble in the display area DA, so that a corresponding portion in which the liquid crystal molecules should be, but are not filled up is generated. However, in the present exemplary embodiment, before filling in the liquid crystal molecules into area 300, at least one test is performed to determine if a gas is leaked through the test hole H formed on the first backflow-blocking pattern 10 before filling liquid crystal molecules, and if so, corrective actions are taken. Thus, by testing for such outgassing by way of the test hole H and taking appropriate corrective actions, later outgassing are avoided and portions in which the liquid crystal molecules are not filled up may be not generated.

The second backflow-blocking pattern 20 may be formed in the first seal-line areas SSA1. The height of the second backflow-blocking pattern 20 is substantially the same as that of the color filter CF. Alternatively, the height of the second backflow-blocking pattern 20 may be higher than that of the color filter CF. The second backflow-blocking pattern 20 (BFBP-20) includes substantially the same layer and/or materials as that of the color filter CF. When a red color filter, a green color filter and a blue color filter are formed on the first display substrate 101, the second backflow-blocking pattern 20 may include substantially the same material as the blue color filter.

The third insulation layer 170 may be further formed on the second backflow-blocking pattern 20. The third insulation layer 170 covers the second backflow-blocking pattern 20 to protect the second backflow-blocking pattern 20 and prevent the second backflow-blocking pattern 20 from being loosed. In addition, the third insulation layer 170 may planarize an upper surface of the second backflow-blocking pattern 20. For example, the third insulation layer 170 may include a silicon nitride or a silicon oxide, and a refractive index of the third insulation layer 170 may be about 1.7 to about 2.1.

The third insulation layer 170 formed on the second backflow-blocking pattern 20 may have a hole H exposing a portion of the second backflow-blocking pattern 20. The second backflow-blocking pattern 20 may include substantially the same material as the color filter CF. Once again, a gas may be leaked from the color filter CF under certain conditions, so that portions in which the liquid crystal molecules are not filled up may be generated. However, in the present exemplary embodiment, if a gas is leaked it may be detected through the hole H formed on the second backflow-blocking pattern 20 before filling liquid crystal molecules and corrective actions may be taken. Thus, portions in which the liquid crystal molecules are not filled up may be not generated.

The pixel electrode PE is formed on third insulation layer 170 and contacted with the drain electrode 153 through a contact hole formed through the third insulation layer 170, the color filter CF and the second insulation layer 160. Thus, the pixel electrode PE is electrically connected to the switching element SW.

The first alignment layer AL1 is formed on the pixel electrode PE. The first alignment layer AL1 is formed in the first display area SDA1 and the first peripheral area SPA1.

The first alignment layer AL1 may include a polyimide based compound, a polyamic acid based compound, or in mixture thereof. The first alignment layer AL1 may be partially formed in or extending into the first seal line area SSA1. However, adhesive strength between the first alignment layer AL1 and the sealing member 400 may be weak. Thus, preferably, an area in the first seal line area SSA1 covered by the first alignment layer AL1 is much narrower than an area in which the first alignment layer AL1 is not formed. The first backflow-blocking pattern 10 may decrease an overlapping area between the first alignment layer AL1 and the sealing member 400. Thus, a lower surface of the sealing member 400 may be directly contacted with the second insulation layer 160 formed on the first display substrate 101. The first alignment layer AL1 may be uniformly formed in the first display area SDA1 and the first peripheral area SPA1 by the first backflow-blocking pattern 10.

The second display substrate 201 may include a second alignment layer AL2. The second display substrate 201 further includes a light-blocking pattern 220a and 220b, an overcoating layer 230 and a common electrode CE.

The light-blocking pattern 220a and 220b is formed in the second display area SDA2 and the second peripheral area SPA2. For example, the light-blocking pattern 220a and 220b may include a matrix portion 220a (e.g., black matrix) formed in the second display area SDA2, and an outer portion 220b connected to the matrix portion 220a and formed in the second peripheral area SPA2. The matrix portion 220a is formed in a boundary between the pixels to divide the pixels in a matrix arrangement and block leakage of uncontrolled light (that not passing through electronically controlled liquid crystals). The outer portion 220b extends into the second seal line area SSA2 from the second peripheral area SPA2.

The overcoating layer 230 is formed on the second base substrate 210 on which the light-blocking pattern 220a and 220b is formed. The overcoating layer 230 may minimize a non-planar stepped portion between a surface of a area in which the light-blocking pattern 220a and 220b is formed and a surface of the second base substrate 210. In addition, the overcoating layer 230 may prevent impurities generated from the light-blocking pattern 220a and 220b from being flowed into the liquid crystal layer 300. The overcoating layer 230 may be not formed in the second base substrate 210 and may be omitted in the second base substrate 210.

The common electrode CE is formed on the overcoating layer 230. The common electrode CE is entirely formed on the second base substrate 210. A vertical electric field is formed between the common electrode CE and the pixel electrode PE. The common electrode CE may be formed of a transparent conductive material such as ITO or IZO.

The second alignment layer AL2 may be directly contacted with the common electrode CE. The second alignment layer AL2 may include a polyimide based compound, a polyamic acid based compound, or in mixture thereof. The second alignment layer AL2 may be uniformly formed in the second display area SDA2 and the second peripheral area SPA2. The second alignment layer AL2 may be partially formed in or extending into the second seal line area SSA2. However, preferably, an area in the seal line area SSA2 covered by the second alignment layer AL2 is much narrower than an area in which the second alignment layer AL2 is not formed. An upper surface of the sealing member 400 may be directly contacted with the common electrode CE formed on the second display substrate 201.

The sealing member 400 is vertically interposed between the first and second seal line areas SSA1 and SSA2. The sealing member 400 may be partially overlapped with the first and second alignment layers AL1 and AL2 in an area adjacent to the first and second peripheral areas SPA1 and SPA2. The second backflow-blocking pattern 20 may minimize an area in which the sealing member 400 overlaps with the first alignment layer AL1 may be minimized, in forming the sealing member 400 on the first or second display substrates 101 or 201.

FIGS. 4 to 11 are cross-sectional views illustrating a method of manufacturing a first display substrate of FIG. 3.

Figure 4:
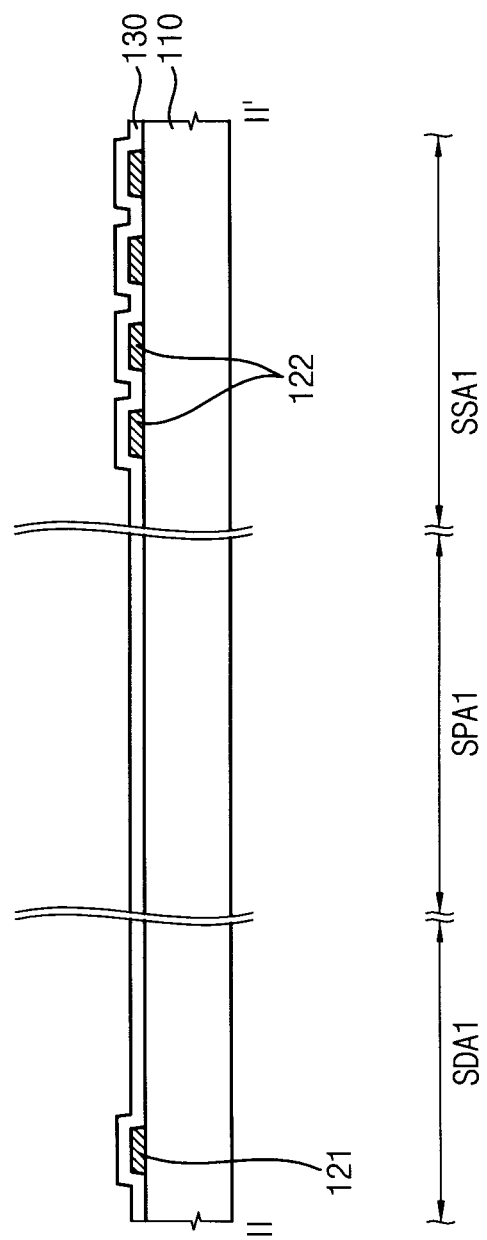
FIGS. 4, 5, 6, 7, 8, 9, 10, and 11 are cross-sectional views illustrating a method of manufacturing a first display substrate of FIG. 3.

Referring to FIG. 4, a gate pattern and the first insulating layer 130 are sequentially formed in the recited order on the first base substrate 110. The gate pattern includes the gate electrode 121, the gate line connected to the gate electrode 121, and the gate metal pattern 122.

The gate electrode 121 may have a single layer structure including copper (Cu), silver (Ag), chrome (Cr), molybdenum (Mo), aluminum (Al), titanium (Ti), manganese (Mn) or a mixture of any these components. In addition, the gate electrode 121 may have a multi layer structure having a plurality of layers including materials different from each other. For example, the gate electrode 121 may include a copper layer and a titanium layer (e.g., TiN) disposed on and/or under the copper layer.

The gate metal pattern 122 may similarly have a single layer structure including copper (Cu), silver (Ag), chrome (Cr), molybdenum (Mo), aluminum (Al), titanium (Ti), manganese (Mn) and a mixture thereof. In addition, the gate metal pattern 122 may have a multi layer structure having a plurality of layers including materials different from each other. For example, the gate metal pattern 122 may include a copper layer and a titanium layer disposed on and/or under the copper layer.

The first insulation layer 130 covers the gate electrode 121 and the gate metal pattern 122. The first insulation layer 130 may include inorganic material such as a silicon oxide (SiOx) and/or a silicon nitride (SiNx). For example, the first insulation layer 130 includes silicon dioxide ($SiO_2$), and may have thickness about 500 Å. In addition, the first insulation layer 130 may include a plurality of layers including materials different from each other.

Figure 5:
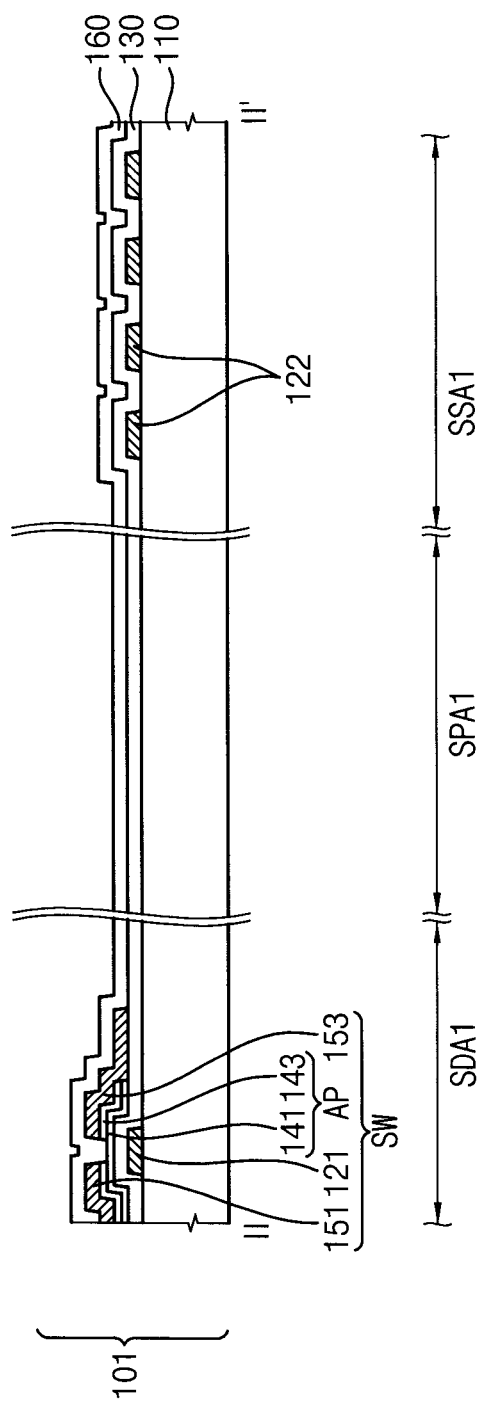

Referring to FIG. 5, an active pattern AP, a source electrode 151, a drain electrode and a second insulation layer 160 are formed on the first base substrate 110 on which the first insulation layer 130 is formed.

The active pattern AP may be formed on the first insulation layer 130. The active pattern AP may be formed on the first insulation layer 130 in an area in which the gate electrode 121 is formed. The active pattern AP may be overlapped with the gate electrode 121 and partially overlapped with the source electrode 151 and the drain electrode 153. The active pattern AP may be interposed between the gate electrode 121 and the source electrode 151. The active pattern AP may be interposed between the gate electrode 121 and the drain electrode 153.

The active pattern AP may include a semiconductive layer 141 and an ohmic contact layer 143 formed on the semiconductive layer 141. The semiconductive layer 141 may include a silicon semiconductor material. For example, the semiconductor layer 141 may include amorphous silicon (a-Si:H). Alternatively, a semiconductive oxide may be used. The ohmic contact layer 143 may be interposed between the semiconductive layer 141 and the source electrode 151, and may be interposed between the semiconductive layer 141 and the drain electrode 153. The ohmic contact layer 143 may be consisted with n+ amorphous silicon (n+a-Si:H).

The source electrode 151 and the drain electrode 153 may be formed on the active pattern AP. The source electrode 151 and the drain electrode 153 may be apart from each other.

The source electrode 151 and the drain electrode 153 may have a single layer structure including copper (Cu), silver (Ag), chrome (Cr), molybdenum (Mo), aluminum (Al), titanium (Ti), manganese (Mn) and a mixture thereof. In addition, the source electrode 151 and the drain electrode 153 may have a multi layer structure having a plurality of layers including materials different from each other. For example, the source electrode 151 and the drain electrode 153 may include a copper layer and a titanium layer disposed on and/or under the copper layer.

The second insulation layer 160 may be formed to cover the source electrode 151 and the drain electrode 153. The second insulation layer 160 may include inorganic material such as a silicon oxide (SiOx) and/or a silicon nitride (SiNx). For example, the second insulation layer 160 includes silicon oxide (SiOx), and may have thickness about 500 Å. In addition, the second insulation layer 160 may include a plurality of layers including materials different from each other.

Figure 6:
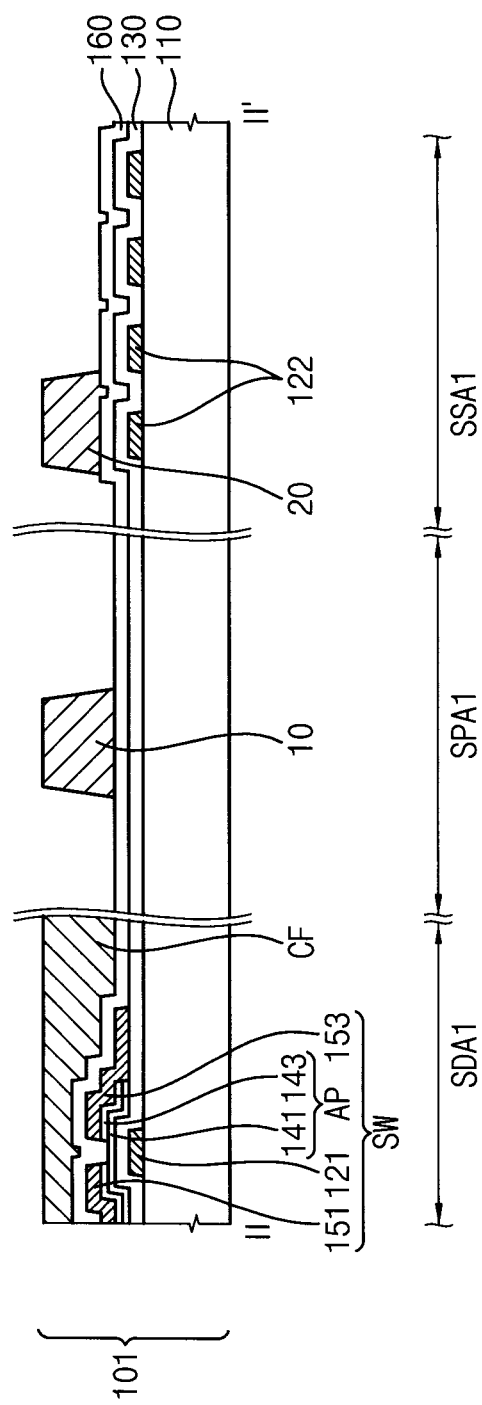

Referring to FIG. 6, a color filter layer is formed on the first base substrate 110 on which the second insulation layer 160 is formed. Thereafter, the color filter layer is patterned to form a color filter CF, a first backflow-blocking pattern 10 and a second backflow-blocking pattern 20.

A height of the color filter CF may be substantially the same as that of the first backflow-blocking pattern 10 and the second backflow-blocking pattern 20. Alternatively, the height of the color filter CF may be different from that of at least one of the first backflow-blocking pattern 10 and the second backflow-blocking pattern 20.

The first backflow-blocking pattern 10 and the second backflow-blocking pattern 20 may be formed by using a color photoresist material comprising a blue pigment, but not limited thereto. The first backflow-blocking pattern 10 and the second backflow-blocking pattern 20 may be formed by using a color photoresist material comprising a red pigment or a green pigment.

Figure 7:
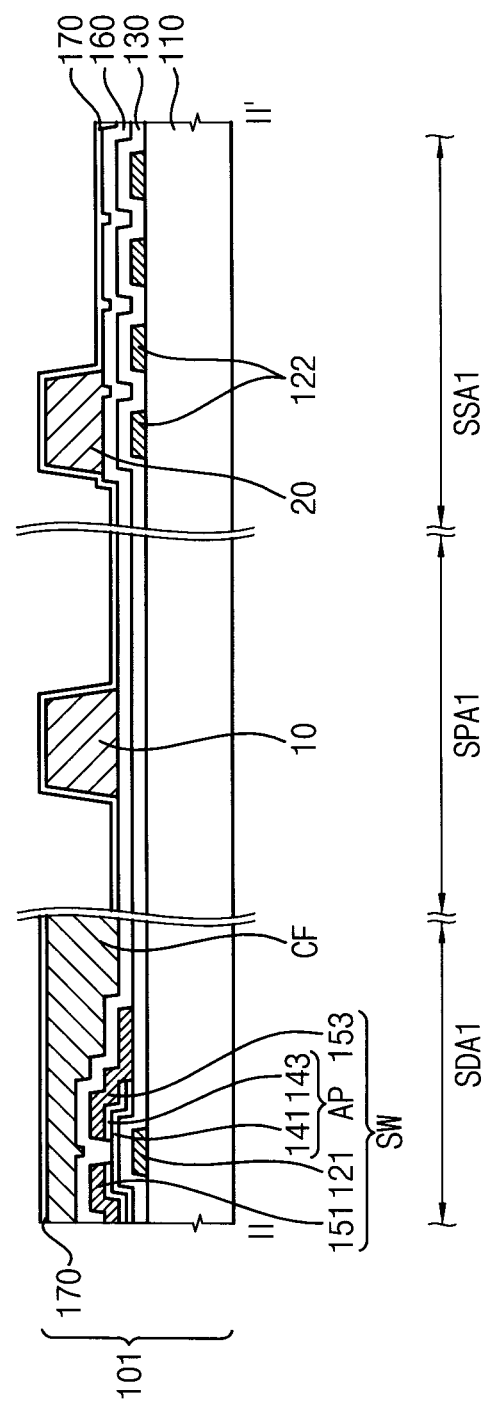

Referring to FIG. 7, a third insulation layer 170 is formed on the first base substrate 110 on which the color filter CF, the first backflow-blocking pattern 10 and the second backflow-blocking pattern 20 are formed.

The third insulation layer 170 covers the color filter CF to protect color filter CF and prevent the color filter CF from being loosed. In addition, the third insulation layer 170 may planarize an upper surface of the color filter CF. For example, the third insulation layer 170 may include a silicon nitride and/or a silicon oxide, and a refractive index of the third insulation layer 170 may be about 1.7 to about 2.1.

Figure 8:
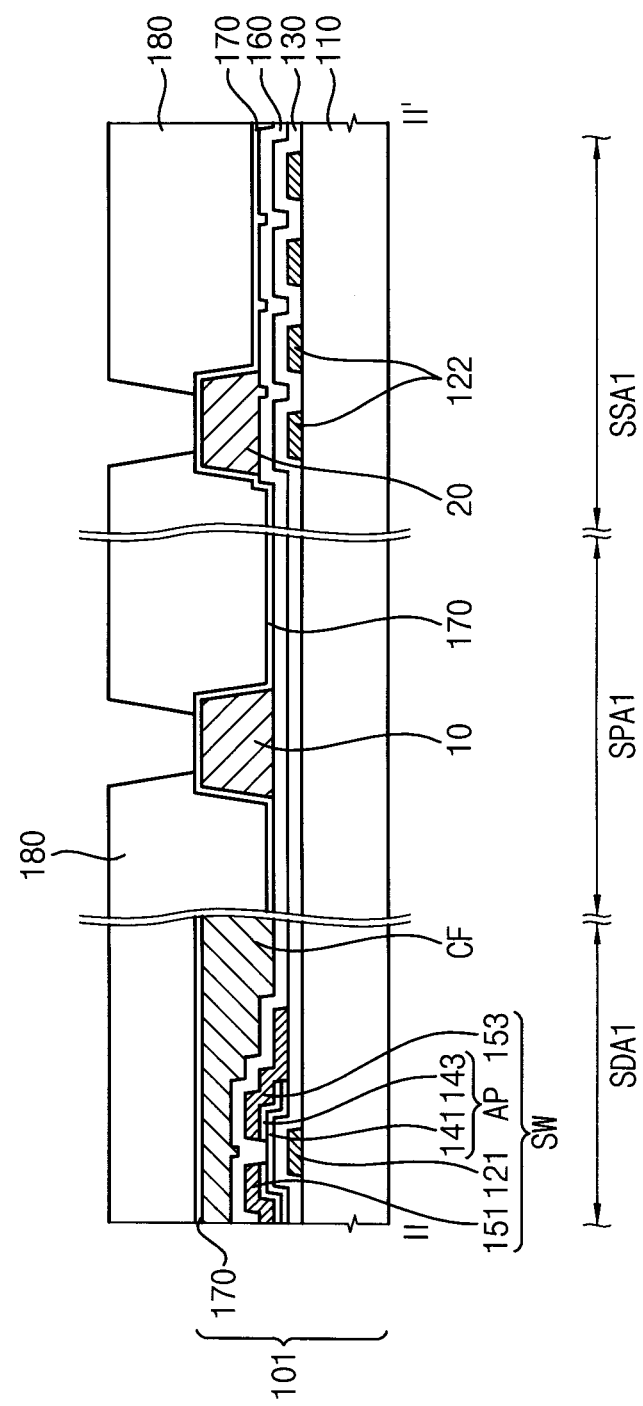

Referring to FIG. 8, a photoresist layer is formed on the first base substrate 110 on which the third insulation layer 170 is formed. Thereafter, the photoresist layer is patterned to form a photo layer 180. The photo layer 180 may expose a portion of the third insulation layer 170 formed on the first backflow-blocking pattern 10 and the second backflow-blocking pattern 20.

Figure 9:
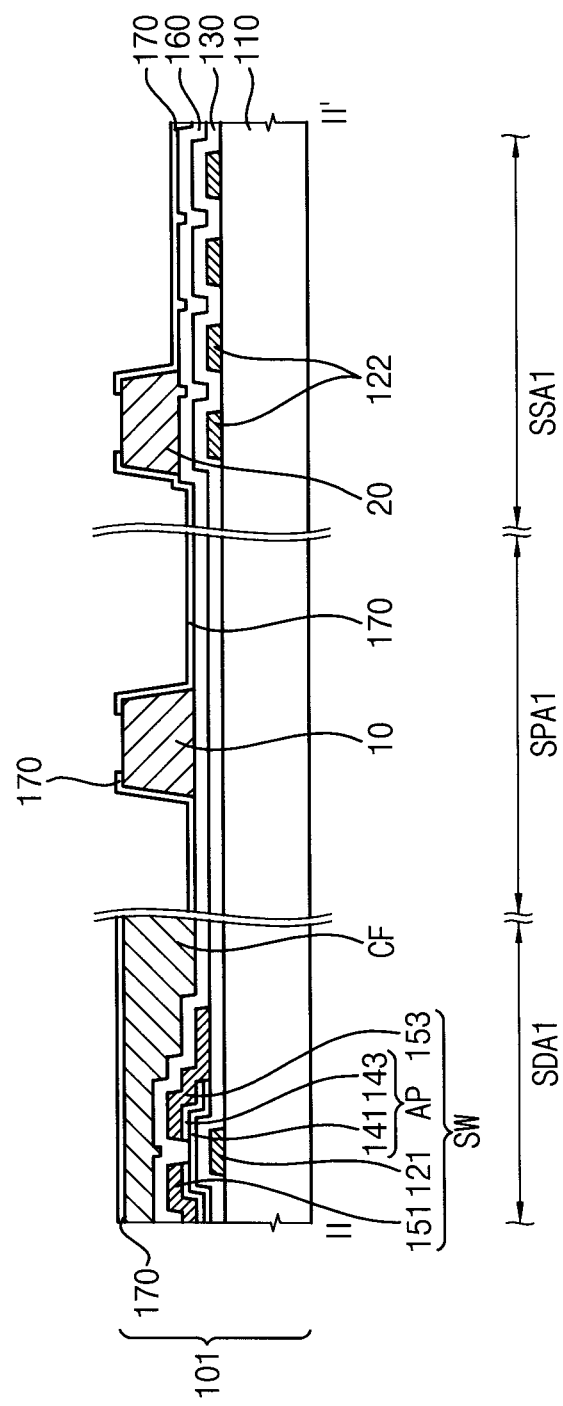

Referring to FIG. 9, the third insulation layer 170 patterned by using the photo layer 180 as a mask. Thereafter, the photo layer 180 is removed and respective holes H are formed through the third insulation layer 170 to thereby communicate with the respective pigmented materials of the first backflow-blocking pattern 10 and the second backflow-blocking pattern 20 respectively.

The first backflow-blocking pattern 10 and the second backflow-blocking pattern 20 may include substantially the same material as the color filter CF. By stressing the structure at this stage and testing the holes H to see if under similar conditions a gas may be leaked (e.g., outgassed) from the color filter CF, corrective actions can be taken so that later portions in which gas rather than the liquid crystal molecules are filled up may not be generated. However, in the present exemplary embodiment, a gas is leaked through the hole H formed on first backflow-blocking pattern 10 and the second backflow-blocking pattern 20 before filling liquid crystal molecules. Thus, portions in which the liquid crystal molecules are not filled up may be not generated.

Figure 10:
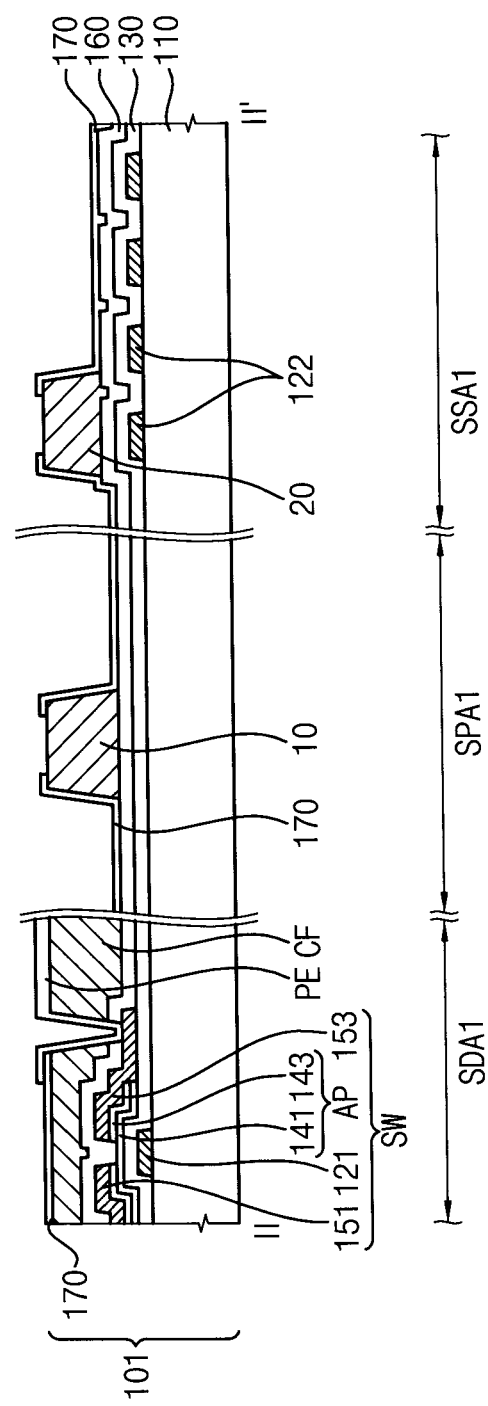

Referring to FIG. 10, a pixel electrode PE is formed on the first base substrate 110 on which the third insulation layer 170 is formed.

The pixel electrode PE is contacted with the drain electrode 153 through a contact hole formed through the third insulation layer 170, the color filter CF and the second insulation layer 160. Thus, the pixel electrode PE is electrically connected to the switching element SW.

Figure 11:
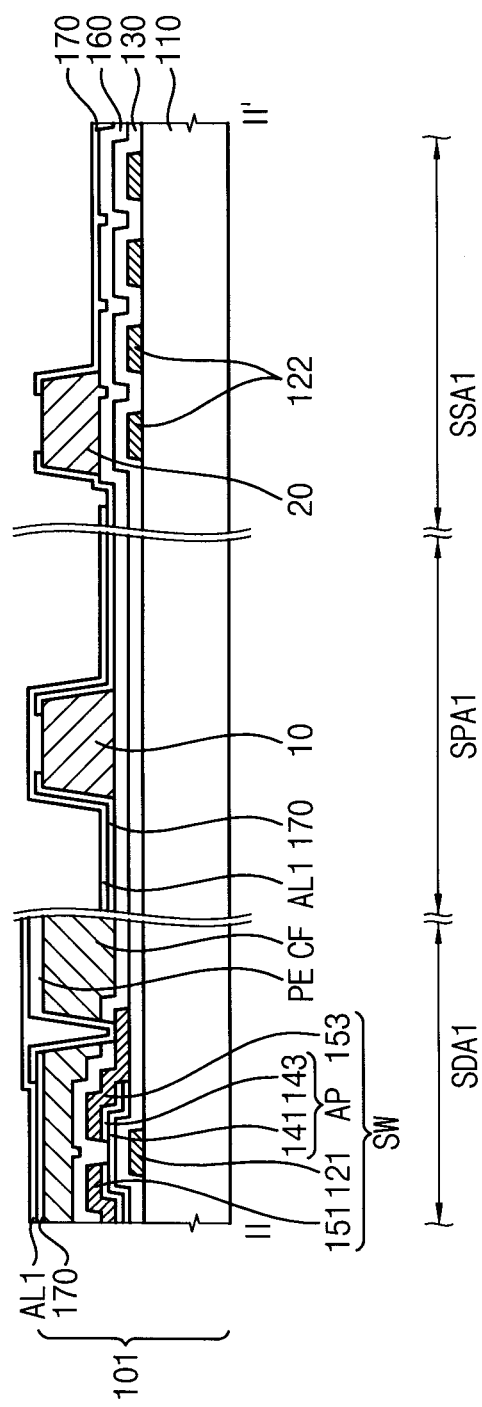

Referring to FIG. 11, a first alignment layer AL1 is formed on the first base substrate 110 on which the pixel electrode PE is formed. The first alignment layer AL1 is formed in the first peripheral area SPA1 and the first display area SDA1. The first backflow-blocking pattern 10 minimizes a rolling of the first alignment layer AL1 toward the first display area SDA1 from the first peripheral area SPA1, so that the first alignment layer AL1 may be uniformly formed in the first display area SDA1. Therefore, the first display substrate 101, on which the first alignment layer AL1 is uniformly formed in the first display area SDA1, is manufactured. As seen in FIG. 11, the formed first alignment layer AL1 covers the outgas hole H of the first backflow-blocking pattern 10. Later, when the sealing member 400 is attached, it will cover the outgas hole H of the second backflow-blocking pattern 20.

Figure 12:
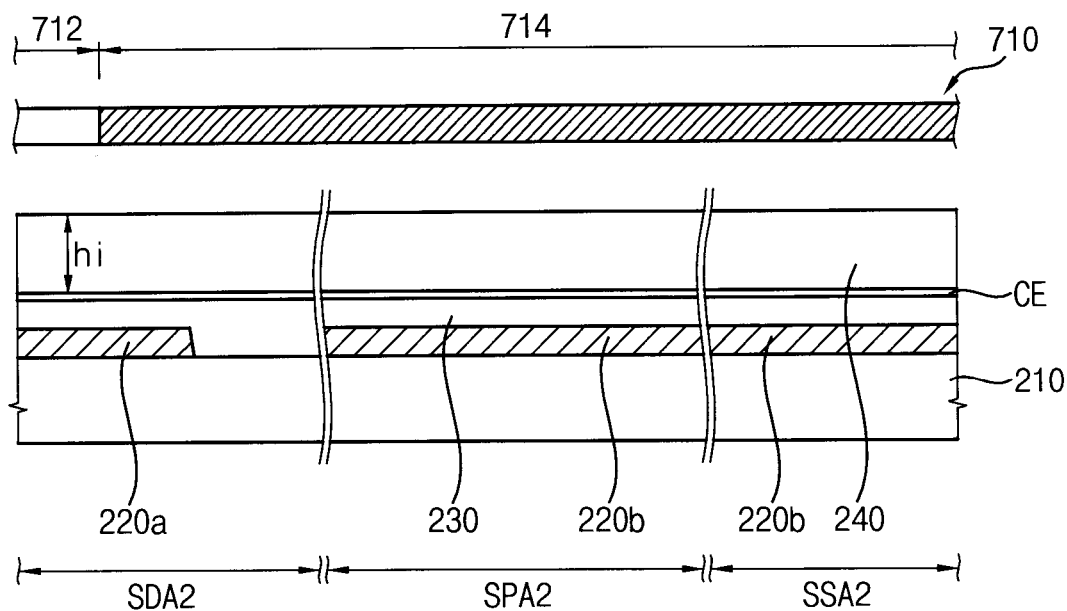
FIGS. 12 and 13 are cross-sectional views illustrating a method of manufacturing a second display substrate of FIG. 3.
Figure 13:
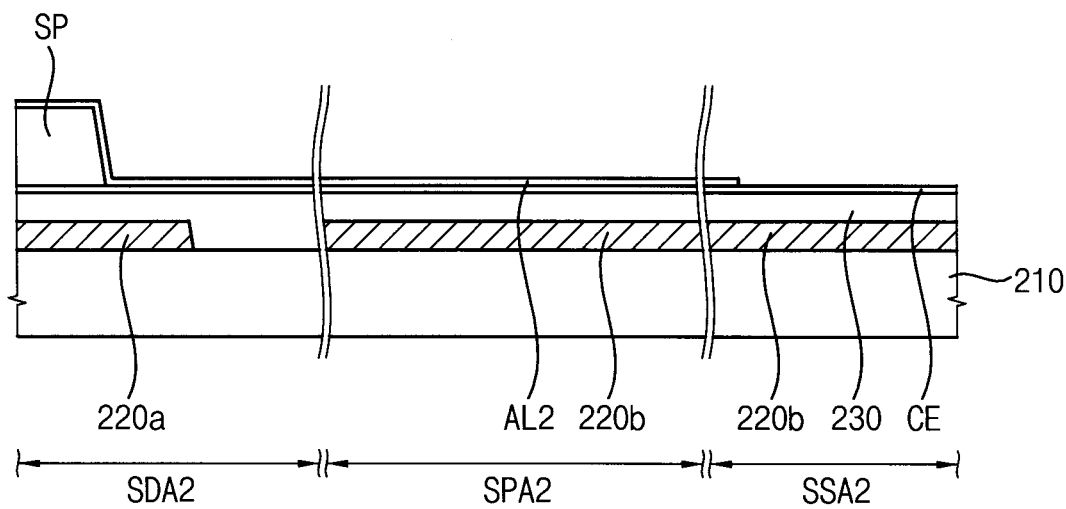

FIGS. 12 and 13 are cross-sectional views illustrating a method of manufacturing a second display substrate of FIG. 3.

Referring to FIG. 12, after the light-blocking pattern 220a and 220b is formed on the second base substrate 210, the overcoating layer 230 and the common electrode CE are sequentially formed on the second base substrate 210 on which the light-blocking pattern 220a and 220b is formed.

A light-blocking layer is formed on the second base substrate 210 and is patterned to form the light-blocking pattern 220a and 220b. The matrix portion 220a of the light-blocking pattern 220a and 220b is formed in the second display area SDA2, and the outer portion 220b is formed in the second peripheral area SPA2 and the second seal line area SSA2. Each of the overcoating layer 230 and the common electrode CE is entirely formed on the second base substrate 210 on which the light-blocking pattern 220a and 220b is formed.

A photo layer 240 is formed on the second base substrate 210 on which the common electrode CE is formed, and a mask 710 is disposed over the photo layer 240.

The photo layer 240 includes an organic material having photosensitivity. The photo layer 240 may include a negative-type photoresist layer which is hardened by light. A predetermined thickness denoted as "hi" of the photo layer 240 may be larger than a predetermined height of the pixel spacer SP.

The mask 710 includes a light-transmissive portion 712 and a light-blocking portion 714. The light-transmissive portion 712 may correspond to a forming area of the pixel spacer SP in the second display area SDA2. The light-blocking portion 714 may correspond to a remaining area except for the forming areas. When the light is provided to the mask 710, the light passes through the light-transmissive portion 712 to be provided to the photo layer 240 and the light is blocked by the light-blocking portion 714 not to be provided to the photo layer 240.

Referring to FIG. 13, the photo layer 240 receiving the light is developed to form the pixel spacer SP. The second alignment layer AL2 is formed on the second base substrate 210 on which the pixel spacer SP is formed.

The second alignment layer AL2 is formed via jetting an ink including the raw material of the second alignment layer AL2 on the second base substrate 210. The second alignment layer AL2 may be formed via additionally rubbing a coating layer coated by the raw material of the second alignment layer AL2 according to a liquid crystal mode of the liquid crystal layer 300. The raw material of the second alignment layer AL2 may include a polyimide based compound and/or a polyamic acid based compound. Alternatively, the second alignment layer may be formed via rolling the raw material using a roller. Therefore, the second display substrate 201, on which the second alignment layer AL2 is uniformly formed in the second display area SDA2, may be manufactured.

Figure 14:
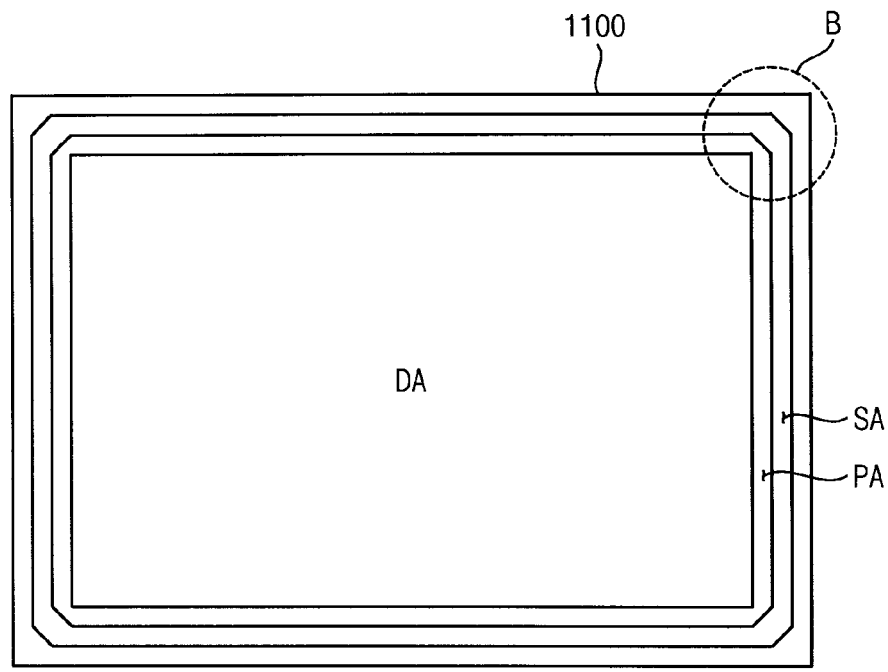
FIG. 14 is a top plan view illustrating another exemplary embodiment of a display substrate according to the present teachings.
Figure 15:
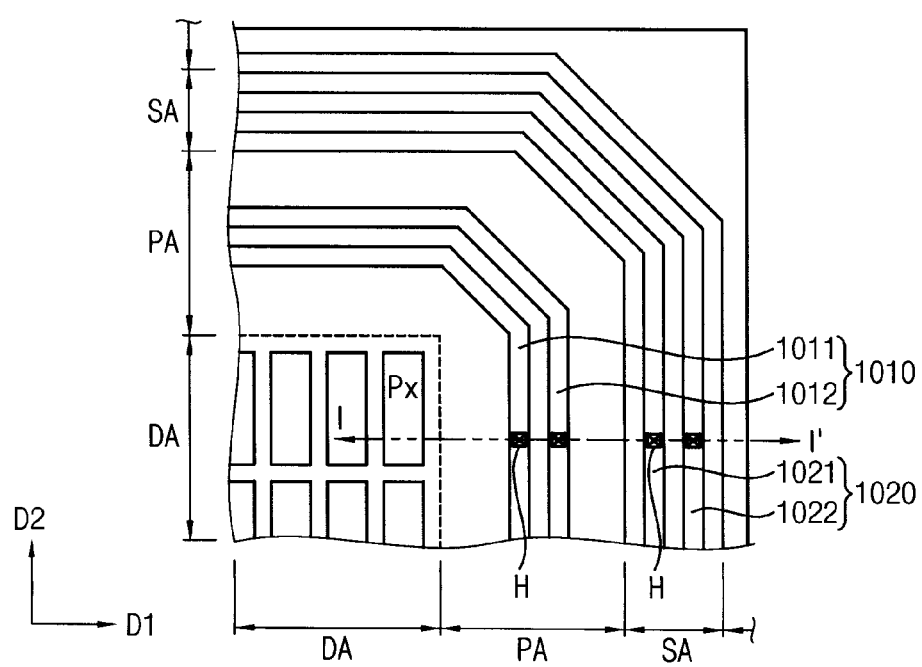
FIG. 15 is a top plan view magnifying a portion B of FIG. 14.

FIG. 14 is a top plan view illustrating an example of a display substrate according to another embodiment. FIG. 15 is a top plan view magnifying a portion B of FIG. 14.

Referring to FIGS. 14 and 15, a corresponding display panel 502 includes a display area DA, a peripheral area PA of the display area DA and a seal-line forming area SA surrounding the peripheral area PA.

The display panel 502 has a quadrilateral shape including four sides connected to each other. A point at which two sides of the four sides cross each other is defined as a vertex of the display panel 502. The display area DA and the display panel 502 may be similar shapes. The display area DA has a quadrilateral shape.

A first backflow-blocking pattern 1010 may be formed in the peripheral area PA. The first backflow-blocking pattern 1010 may include a first sub backflow-blocking pattern 1011 and a spaced apart second sub backflow-blocking pattern 1012. The first backflow-blocking pattern 10 may be formed of the same layer as a color filter disposed in the display area DA. When a red color filter, a green color filter and a blue color filter are formed in the display area DA, the first sub backflow-blocking pattern 1011 and the second sub backflow-blocking pattern 1012 may include substantially the same material as the blue color filter and the red color filter respectively. However, the first sub backflow-blocking pattern 1011 and the second sub backflow-blocking pattern 1012 are not limited thereto. The first sub backflow-blocking pattern 1011 and the second sub backflow-blocking pattern 1012 may have a multilayered structure including at least two color layers of substantially the same layers and/or materials as those of the red, green and blue color filters. For example, the first sub backflow-blocking pattern 1011 and the second sub backflow-blocking pattern 1012 may include the multilayered structure such as a double layered structure or a triple layered structure.

A second backflow-blocking pattern 1020 may be formed in the seal-line forming area SA. The second backflow-blocking pattern 1020 may include a third sub backflow-blocking pattern 1021 and a spaced apart fourth sub backflow-blocking pattern 1022. The second backflow-blocking pattern 1020 may be formed of the same layer as a color filter disposed in the display area DA. When a red color filter, a green color filter and a blue color filter are formed in the display area DA, the third sub backflow-blocking pattern 1021 and the fourth sub backflow-blocking pattern 1022 may include substantially the same material as the blue color filter and the red color filter respectively. However, the third sub backflow-blocking pattern 1021 and the fourth sub backflow-blocking pattern 1022 are not limited thereto. The third sub backflow-blocking pattern 1021 and the fourth sub backflow-blocking pattern 1022 may have a multilayered structure including at least two color layers of substantially the same layers as the red, green and blue color filters. For example, the third sub backflow-blocking pattern 1021 and the fourth sub backflow-blocking pattern 1022 may include the multilayered structure such as a double layered structure or a triple layered structure.

Figure 16:
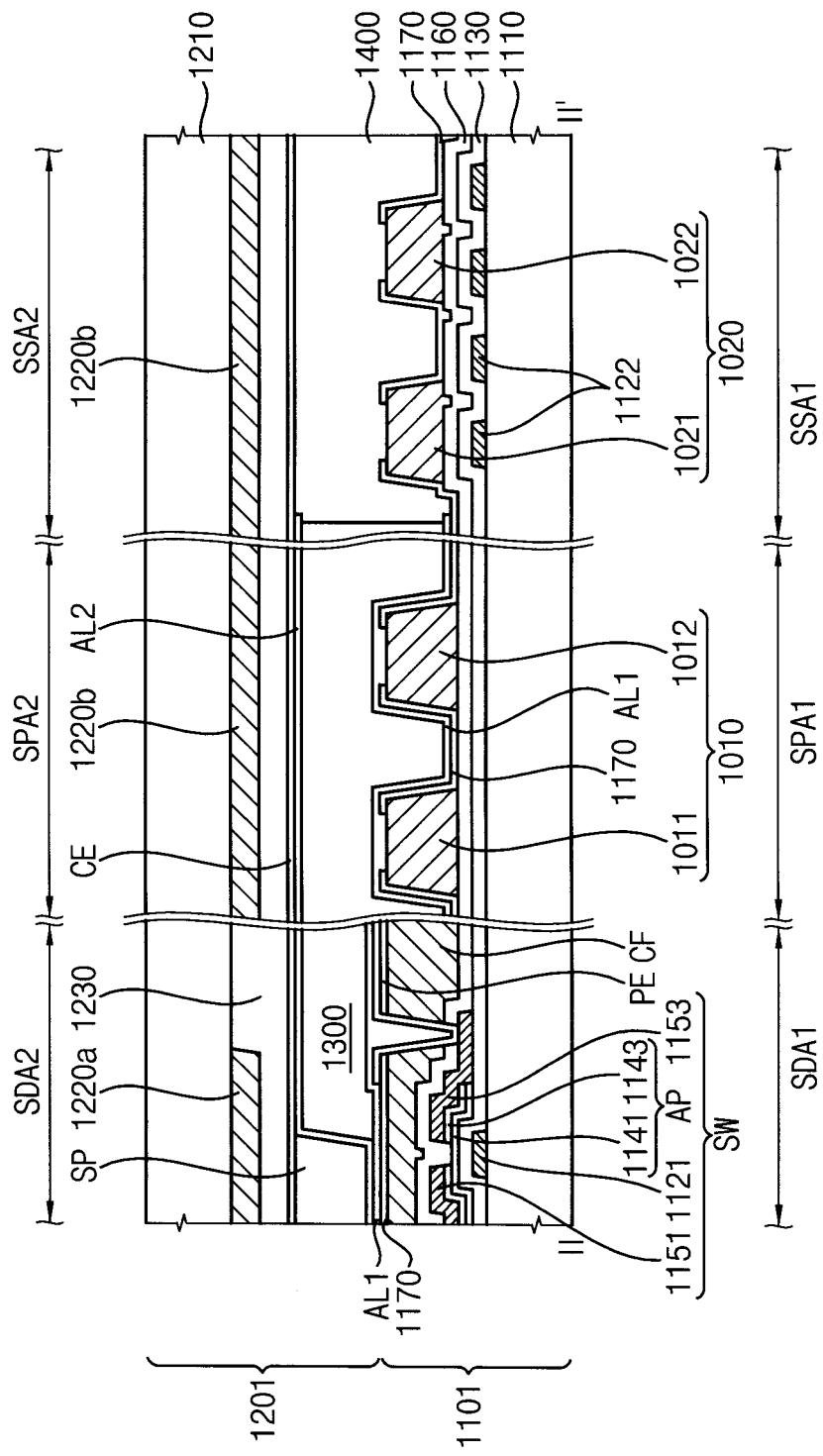
FIG. 16 is a cross-sectional view taken along line II-II' of FIG. 15.

FIG. 16 is a cross-sectional view taken along line II-II' of FIG. 15.

Referring to FIG. 16, the display substrate 502 includes a first display substrate 1101, a second display substrate 1201, the liquid crystal layer 1300 and the sealing member 1400. The sealing member 1400 sealingly bonds and thus combines the first display substrate 1101 with the second display substrate 1201, and seals the liquid crystal layer 1300 between the first and second display substrates 1101 and 1201.

A first base substrate 1110 of the first display substrate 1101 includes a first display area SDA1 corresponding to the display area DA shown FIGS. 14 and 15, a first peripheral area SPA1 corresponding to the peripheral area PA and a first seal-line area SSA1 corresponding to the seal-line forming area SA. A second base substrate 1210 of the second display substrate 1201 includes a second display area SDA2 facing the first display area SDA1, a second peripheral area SPA2 facing the first peripheral area SPA1 and a second seal-line area SSA2 facing the first seal-line area SSA1. For example, the first and second display areas SDA1 and SDA2 overlap with each other to define the display area DA of the display panel 501, the first and second peripheral areas SPA1 and SPA2 overlap with each other to define the peripheral area PA, and the first and second seal-line areas SSA1 and SSA2 overlap with each other to define the seal-line forming area SA.

A first backflow-blocking pattern 1010 and a second backflow-blocking pattern 1020 are formed on the first base substrate 1110. For example, the first display substrate 1101 includes the first backflow-blocking pattern 1010 and the second backflow-blocking pattern 1020 formed in the first peripheral area SPA1. The first backflow-blocking pattern 1010 may include a first sub backflow-blocking pattern 1011 and a second sub backflow-blocking pattern 1012. The second backflow-blocking pattern 1020 may include a third sub backflow-blocking pattern 1021 and a fourth sub backflow-blocking pattern 1022. In addition, the sealing member 1400 is vertically interposed between the first and second seal-line areas SSA1 and SSA2.

The first display substrate 1101 includes a first alignment layer AL1 uniformly formed in the first display area SDA1 and the first peripheral area SPA1 by the first backflow-blocking pattern 1010. The first display substrate 1101 further includes a switching element SW, the color filter CF and the pixel electrode PE which are formed in the first display area SDA1, and a gate metal pattern 1122 formed in the first peripheral area SPA1.

The switching element SW includes a gate electrode 1121, an active pattern AP, a source electrode 1151 and a drain electrode 1153. The gate electrode 1121 is connected to a gate line (not shown) extending along the first direction D1 of the first display area SDA1. A cross-sectional structure of the gate line is substantially the same as the gate electrode 1121. The active pattern AP is formed on a first insulation layer 1130 which is formed on the gate electrode 1121. The active pattern AP includes a semiconductive layer 1141 substantially functioned as a channel of the switching element SW and an ohmic contact layer 1143 formed on the semiconductive layer 1141. The source electrode 1151 is connected to a data line (not shown) extending along the second direction D2 and crossing the gate line. A cross-sectional structure of the data line is substantially the same as the source electrode 1151. The drain electrode 1153 is spaced apart from the source electrode 1151.

The color filter CF may be formed in the first display area SDA1. The color filter CF may cover the switching element SW. The color filter CF is formed on a second insulation layer 1160 covering the source and drain electrodes 1151 and 1153. The second insulation layer 1160 may be omitted, and not be formed on the first base substrate 1110.

A third insulation layer 1170 may be further formed on the color filter CF. The third insulation layer 1170 covers the color filter CF to protect the color filter CF and prevent the color filter CF from being loosed. In addition, the third insulation layer 1170 may planarize an upper surface of the color filter CF. For example, the third insulation layer 1170 may include a silicon nitride and/or a silicon oxide, and a refractive index of the third insulation layer 1170 may be about 1.7 to about 2.1.

The gate metal pattern 1122 includes substantially the same metal components as those of the gate electrode 1121. The gate metal pattern 1122 may be an antistatic pattern preventing a static electricity from being flowed into the first display area SDA1 or be a signal line pattern applying a driving signal and/or a control signal to the first display area SDA1. The gate metal pattern 1122 is covered by the first insulation layer 1130 and the second insulation layer 1160.

The first backflow-blocking pattern 1010 may be formed in the first peripheral area SPA1. The height of the first backflow-blocking pattern 1010 is substantially the same as that of the color filter CF. Alternatively, the height of the first backflow-blocking pattern 1010 may be higher than that of the color filter CF. The first backflow-blocking pattern 1010 includes substantially the same layer as the color filter CF. The first backflow-blocking pattern 1010 may include a first sub backflow-blocking pattern 1011 and a second sub backflow-blocking pattern 1012. When a red color filter, a green color filter and a blue color filter are formed on the first display substrate 1101, the first sub backflow-blocking pattern 1011 and the second sub backflow-blocking pattern 1012 may include substantially the same material as the blue color filter and the red color filter respectively.

The third insulation layer 1170 may be further formed on the first backflow-blocking pattern 1010. The third insulation layer 1170 covers the first backflow-blocking pattern 1010 to protect the first backflow-blocking pattern 1010 and prevent the first backflow-blocking pattern 1010 from being loosed. In addition, the third insulation layer 1170 may planarize an upper surface of the first backflow-blocking pattern 1010. For example, the third insulation layer 1170 may include a silicon nitride or a silicon oxide, and a refractive index of the third insulation layer 1170 may be about 1.7 to about 2.1.

The third insulation layer 1170 formed on the first backflow-blocking pattern 1010 may have a hole H exposing a portion of the first backflow-blocking pattern 1010. The first backflow-blocking pattern 1010 may include substantially the same material as the color filter CF. A gas may be leaked from the color filter CF under certain conditions tested for and corrected for, so that portions in which the liquid crystal molecules are not filled up may be generated. However, in the present exemplary embodiment, a gas is leaked through the hole H formed on the first backflow-blocking pattern 1010 before filling liquid crystal molecules. Thus, portions in which the liquid crystal molecules are not filled up may be not generated.

The second backflow-blocking pattern 1020 may be formed in the first seal-line areas SSA1. The height of the second backflow-blocking pattern 1020 is substantially the same as that of the color filter CF. Alternatively, the height of the second backflow-blocking pattern 1020 may be higher than that of the color filter CF. The second backflow-blocking pattern 20 includes substantially the same layer as the color filter CF. The second backflow-blocking pattern 1020 may include a third sub backflow-blocking pattern 1021 and a fourth sub backflow-blocking pattern 1022. When a red color filter, a green color filter and a blue color filter are formed in the display area DA, the third sub backflow-blocking pattern 1021 and the fourth sub backflow-blocking pattern 1022 may include substantially the same material as the blue color filter and the red color filter respectively.

The third insulation layer 1170 may be further formed on the second backflow-blocking pattern 1020. The third insulation layer 1170 covers the second backflow-blocking pattern 1020 to protect the second backflow-blocking pattern 1020 and prevent the second backflow-blocking pattern 1020 from being loosed. In addition, the third insulation layer 1170 may planarize an upper surface of the second backflow-blocking pattern 1020. For example, the third insulation layer 1170 may include a silicon nitride or a silicon oxide, and a refractive index of the third insulation layer 1170 may be about 1.7 to about 2.1.

The third insulation layer 1170 formed on the second backflow-blocking pattern 1020 may have a hole H exposing a portion of the second backflow-blocking pattern 1020. The second backflow-blocking pattern 1020 may include substantially the same material as the color filter CF. A gas may be leaked from the color filter CF under certain conditions tested for and corrected for, so that portions in which the liquid crystal molecules are not filled up may be generated. However, in the present exemplary embodiment, a gas is leaked through the hole H formed on the second backflow-blocking pattern 1020 before filling liquid crystal molecules. Thus, portions in which the liquid crystal molecules are not filled up may be not generated.

The pixel electrode PE is formed on third insulation layer 1170 and contacted with the drain electrode 1153 through a contact hole formed through the third insulation layer 1170, the color filter CF and the second insulation layer 1160. Thus, the pixel electrode PE is electrically connected to the switching element SW.

The first alignment layer AL1 is formed on the pixel electrode PE. The first alignment layer AL1 is formed in the first display area SDA1 and the first peripheral area SPA1.

The first alignment layer AL1 may include a polyimide based compound, a polyamic acid based compound, or in mixture thereof. The first alignment layer AL1 may be partially formed in or extending into the first seal line area SSA1. However, an adhesive strength between the first alignment layer AL1 and the sealing member 1400 is weak. Thus, preferably, an area in the first seal line area SSA1 covered by the first alignment layer AL1 is much narrower than an area in which the first alignment layer AL1 is not formed. The first backflow-blocking pattern 1010 may decrease an overlapping area between the first alignment layer AL1 and the sealing member 1400. Thus, a lower surface of the sealing member 1400 may be directly contacted with the second insulation layer 1160 formed on the first display substrate 1101. The first alignment layer AL1 may be uniformly formed in the first display area SDA1 and the first peripheral area SPA1 by the first backflow-blocking pattern 1010.

The second display substrate 1201 may include a second alignment layer AL2. The second display substrate 1201 further includes a light-blocking pattern 1220a and 1220b, an overcoating layer 1230 and a common electrode CE.

The light-blocking pattern 1220a and 1220b is formed in the second display area SDA2 and the second peripheral area SPA2. For example, the light-blocking pattern 1220a and 1220b may include a matrix portion 1220a formed in the second display area SDA2, and an outer portion 1220b connected to the matrix portion 1220a and formed in the second peripheral area SPA2. The matrix portion 1220a is formed in a boundary between the pixels to divide the pixels in a matrix arrangement. The outer portion 1220b extends into the second seal line area SSA2 from the second peripheral area SPA2.

The overcoating layer 1230 is formed on the second base substrate 1210 on which the light-blocking pattern 1220a and 1220b is formed. The overcoating layer 1230 may minimize a stepped portion between a surface of a area in which the light-blocking pattern 1220a and 1220b is formed and a surface of the second base substrate 1210. In addition, the overcoating layer 1230 may prevent impurities generated from the light-blocking pattern 1220a and 1220b from being flowed into the liquid crystal layer 1300. The overcoating layer 1230 may be not formed in the second base substrate 1210 and may be omitted in the second base substrate 1210.

The common electrode CE is formed on the overcoating layer 1230. The common electrode CE is entirely formed on the second base substrate 1210. A vertical electric field is formed between the common electrode CE and the pixel electrode PE.

The second alignment layer AL2 may be directly contacted with the common electrode CE. The second alignment layer AL2 may include a polyimide based compound, a polyamic acid based compound, or in mixture thereof. The second alignment layer AL2 may be uniformly formed in the second display area SDA2 and the second peripheral area SPA2. The second alignment layer AL2 may be partially formed in or extending into the second seal line area SSA2. However, preferably, an area in the seal line area SSA2 covered by the second alignment layer AL2 is much narrower than an area in which the second alignment layer AL2 is not formed. An upper surface of the sealing member 1400 may be directly contacted with the common electrode CE formed on the second display substrate 1201.

The sealing member 1400 is interposed between the first and second seal line areas SSA1 and SSA2. The sealing member 1400 may be partially overlapped with the first and second alignment layers AL1 and AL2 in a area adjacent to the first and second peripheral areas SPA1 and SPA2. The second backflow-blocking pattern 1020 may minimize an area in which the sealing member 1400 overlaps with the first alignment layer AL1 may be minimized, in forming the sealing member 1400 on the first or second display substrates 1101 or 1201.

FIGS. 17 to 24 are cross-sectional views illustrating a method of manufacturing a first display substrate of FIG. 16.

Figure 17:
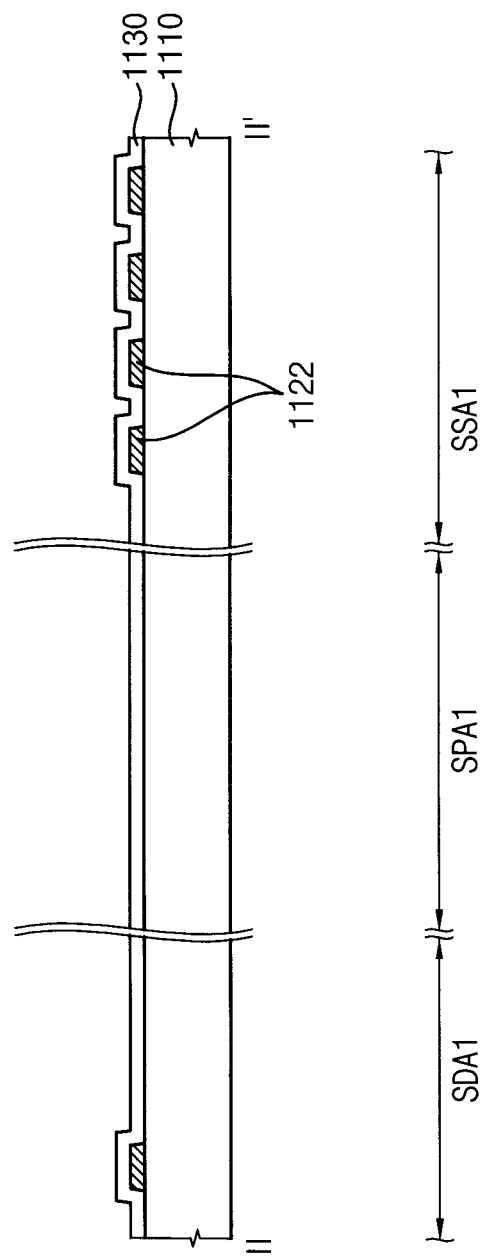
FIGS. 17, 18, 19, 20, 21, 22, 23, and 24 are cross-sectional views illustrating a method of manufacturing a first display substrate of FIG. 16.

Referring to FIG. 17, a gate pattern and the first insulating layer 1130 are sequentially formed on the first base substrate 1110. The gate pattern includes the gate electrode 1121, the gate line connected to the gate electrode 1121, and the gate metal pattern 1122.

The gate electrode 1121 may have a single layer structure including copper (Cu), silver (Ag), chrome (Cr), molybdenum (Mo), aluminum (Al), titanium (Ti), manganese (Mn) and a mixture thereof. In addition, the gate electrode 1121 may have a multi layer structure having a plurality of layers including materials different from each other. For example, the gate electrode 1121 may include a copper layer and a titanium layer disposed on and/or under the copper layer.

The gate metal pattern 1122 may have a single layer structure including copper (Cu), silver (Ag), chrome (Cr), molybdenum (Mo), aluminum (Al), titanium (Ti), manganese (Mn) and a mixture thereof. In addition, the gate metal pattern 1122 may have a multi layer structure having a plurality of layers including materials different from each other. For example, the gate metal pattern 1122 may include a copper layer and a titanium layer disposed on and/or under the copper layer.

The first insulation layer 1130 covers the gate electrode 1121 and the gate metal pattern 1122. The first insulation layer 1130 may include inorganic material such as a silicon oxide (SiOx) and/or a silicon nitride (SiNx). For example, the first insulation layer 1130 includes silicon oxide (SiOx), and may have thickness about 500 Å. In addition, the first insulation layer 1130 may include a plurality of layers including materials different from each other.

Figure 18:
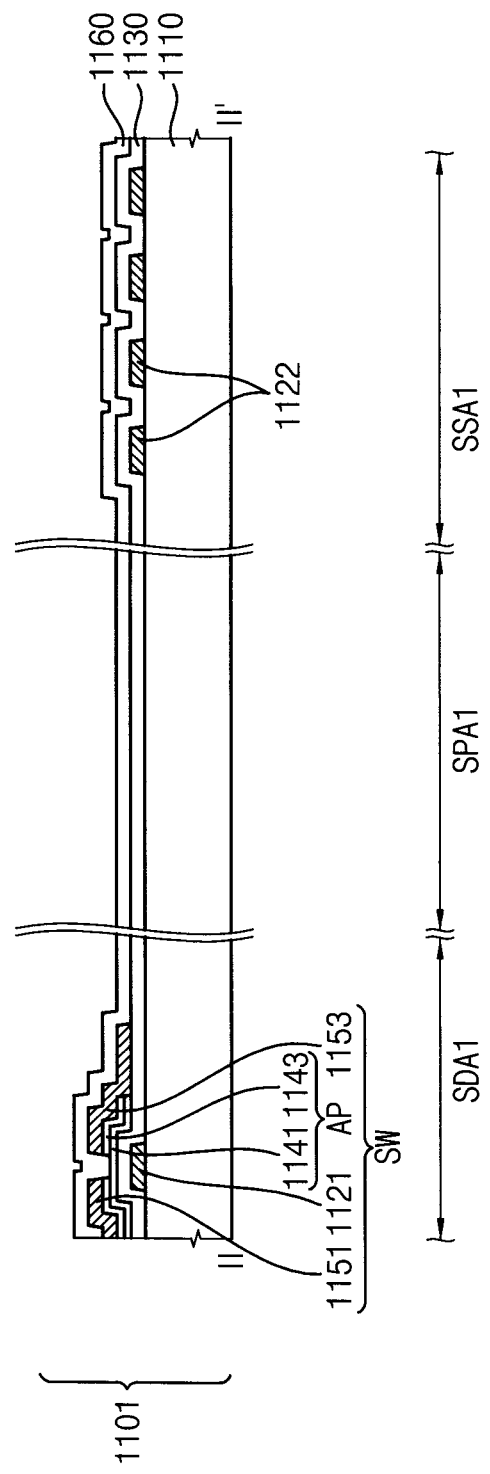

Referring to FIG. 18, an active pattern AP, a source electrode 1151, a drain electrode and a second insulation layer 1160 are formed on the first base substrate 1110 on which the first insulation layer 1130 is formed.

The active pattern AP may be formed on the first insulation layer 1130. The active pattern AP may be formed on the first insulation layer 1130 in a area in which the gate electrode 1121 is formed. The active pattern AP may be overlapped with the gate electrode 1121 and partially overlapped with the source electrode 1151 and the drain electrode 1153. The active pattern AP may be interposed between the gate electrode 1121 and the source electrode 1151. The active pattern AP may be interposed between the gate electrode 1121 and the drain electrode 1153.

The active pattern AP may include a semiconductive layer 1141 and an ohmic contact layer 1143 formed on the semiconductive layer 1141. The semiconductive layer 1141 may include a silicon semiconductor material. For example, the semiconductor layer 1141 may include amorphous silicon (a-Si:H). The ohmic contact layer 1143 may be interposed between the semiconductive layer 1141 and the source electrode 1151, and may be interposed between the semiconductive layer 1141 and the drain electrode 1153. The ohmic contact layer 1143 may be consisted with n+ amorphous silicon (n+a-Si:H).

The source electrode 1151 and the drain electrode 1153 may be formed on the active pattern AP. The source electrode 1151 and the drain electrode 1153 may be apart from each other.

The source electrode 1151 and the drain electrode 1153 may have a single layer structure including copper (Cu), silver (Ag), chrome (Cr), molybdenum (Mo), aluminum (Al), titanium (Ti), manganese (Mn) and a mixture thereof. In addition, the source electrode 1151 and the drain electrode 1153 may have a multi layer structure having a plurality of layers including materials different from each other. For example, the source electrode 1151 and the drain electrode 1153 may include a copper layer and a titanium layer disposed on and/or under the copper layer.

The second insulation layer 1160 may be formed to cover the source electrode 1151 and the drain electrode 1153. The second insulation layer 1160 may include inorganic material such as silicon oxide (SiOx) and/or silicon nitride (SiNx). For example, the second insulation layer 1160 includes silicon oxide (SiOx), and may have thickness about 500 Å. In addition, the second insulation layer 1160 may include a plurality of layers including materials different from each other.

Figure 19:
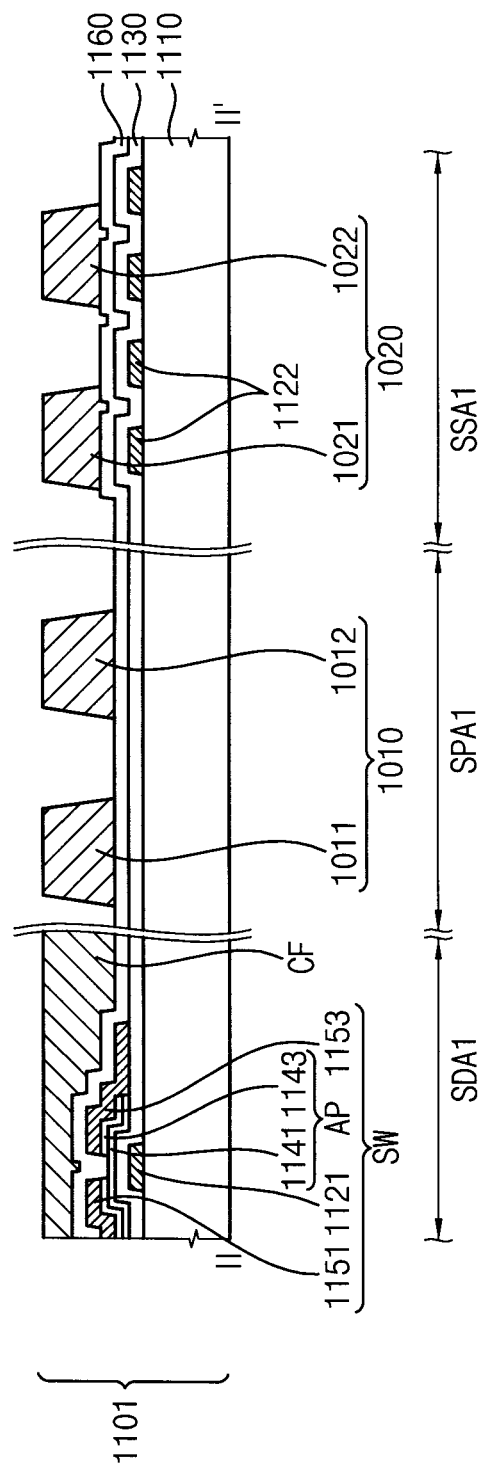

Referring to FIG. 19, a color filter layer is formed on the first base substrate 1110 on which the second insulation layer 1160 is formed. Thereafter, the color filter layer is patterned to form a color filter CF, a first backflow-blocking pattern 1010 and a second backflow-blocking pattern 1020. The first backflow-blocking pattern 1010 may include a first sub backflow-blocking pattern 1011 and a second sub backflow-blocking pattern 1012. The second backflow-blocking pattern 1020 may include a third sub backflow-blocking pattern 1021 and a fourth sub backflow-blocking pattern 1022.

A height of the color filter CF may be substantially the same as that of the first backflow-blocking pattern 1010 and the second backflow-blocking pattern 1020. Alternatively, the height of the color filter C2 may be different from that of the first backflow-blocking pattern 1010 and the second backflow-blocking pattern 1020.

The first sub backflow-blocking pattern 1011 and the second sub backflow-blocking pattern 1012 may be formed by using a color photoresist material comprising a blue pigment and a color photoresist material comprising a red pigment respectively. The third sub backflow-blocking pattern 1021 and the fourth sub backflow-blocking pattern 1022 may be formed by using a color photoresist material comprising a blue pigment and a color photoresist material comprising a red pigment respectively. However, the first backflow-blocking pattern 1010 and the second backflow-blocking pattern 1020 are not limited thereto. The first sub backflow-blocking pattern 1011 and the second sub backflow-blocking pattern 1012 may have a multilayered structure including at least two color layers of substantially the same layers as the red, green and blue color filters respectively. In addition, the third sub backflow-blocking pattern 1021 and the fourth sub backflow-blocking pattern 1022 may have a multilayered structure including at least two color layers of substantially the same layers as the red, green and blue color filters respectively.

Figure 20:
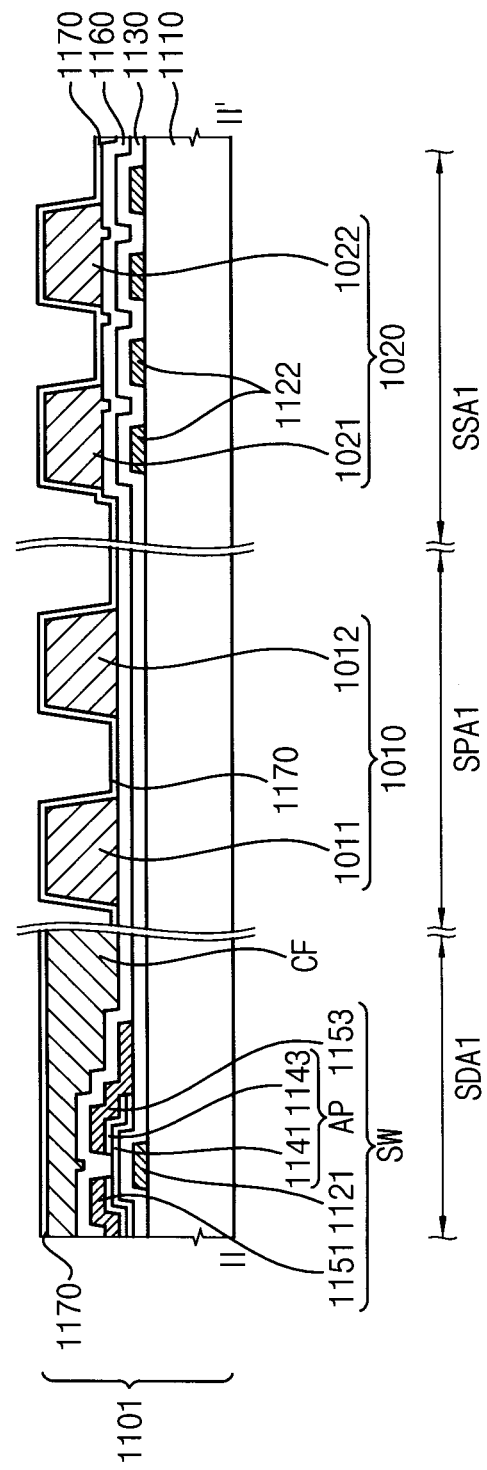

Referring to FIG. 20, a third insulation layer 1170 is formed on the first base substrate 1110 on which the color filter CF, the first backflow-blocking pattern 1010 and the second backflow-blocking pattern 1020 are formed.

The third insulation layer 1170 covers the color filter CF to protect color filter CF and prevent the color filter CF from being loosed. In addition, the third insulation layer 1170 may planarize an upper surface of the color filter CF. For example, the third insulation layer 1170 may include silicon nitride or silicon oxide, and a refractive index of the third insulation layer 1170 may be about 1.7 to about 2.1.

Figure 21:
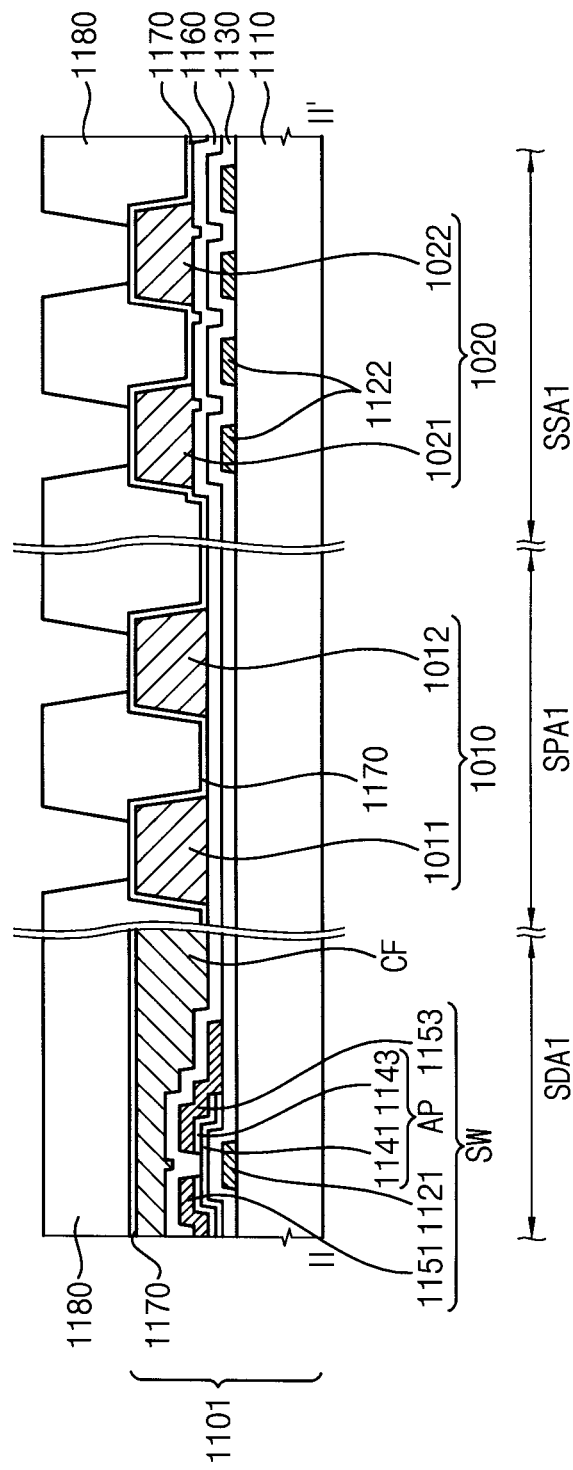

Referring to FIG. 21, a photoresist layer is formed on the first base substrate 1110 on which the third insulation layer 1170 is formed. Thereafter, the photoresist layer is patterned to form a photo layer 1180. The photo layer 1180 may expose a portion of the third insulation layer 1170 formed on the first backflow-blocking pattern 1010 and the second backflow-blocking pattern 1020.

Figure 22:
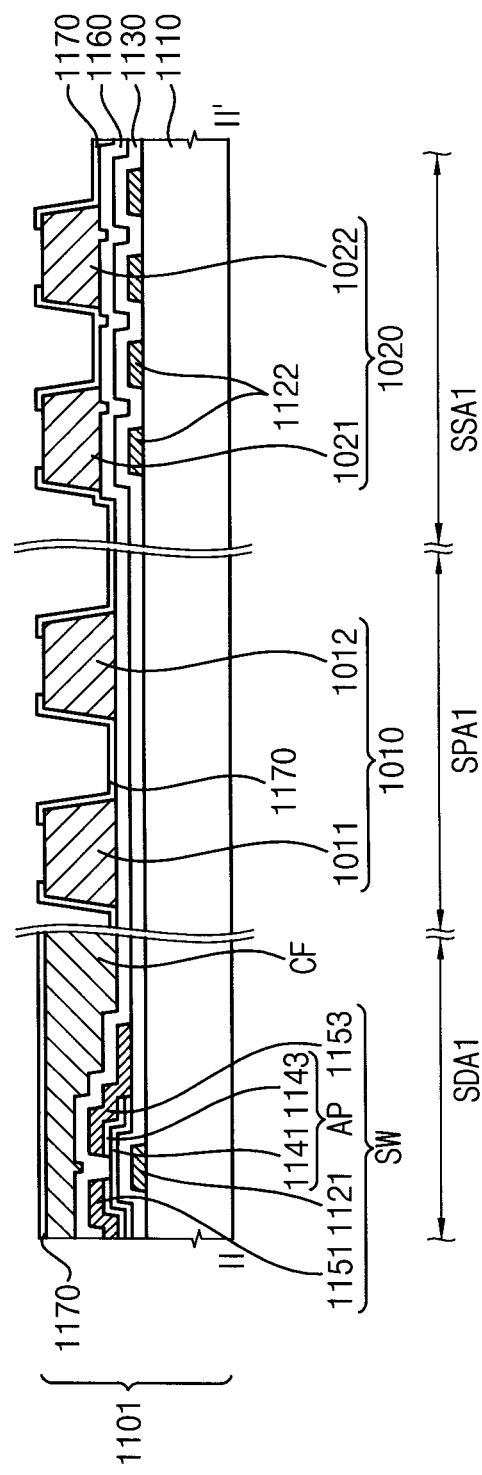

Referring to FIG. 22, the third insulation layer 1170 patterned by using the photo layer 1180 as a mask. Thereafter, the photo layer 1180 is removed and the illustrated outgas holes H respective formed through the third insulation layer 1170 formed on the first backflow-blocking pattern 1010 and the second backflow-blocking pattern 1020.

The first backflow-blocking pattern 1010 and the second backflow-blocking pattern 1020 may include substantially the same material as the color filter CF. A gas may be leaked from the color filter CF under certain conditions tested for and corrected for, so that portions in which the liquid crystal molecules are not filled up may be generated. However, in the present exemplary embodiment, a gas is leaked through the hole H formed on first backflow-blocking pattern 1010 and the second backflow-blocking pattern 1020 before filling liquid crystal molecules. Thus, portions in which the liquid crystal molecules are not filled up may be not generated.

Figure 23:
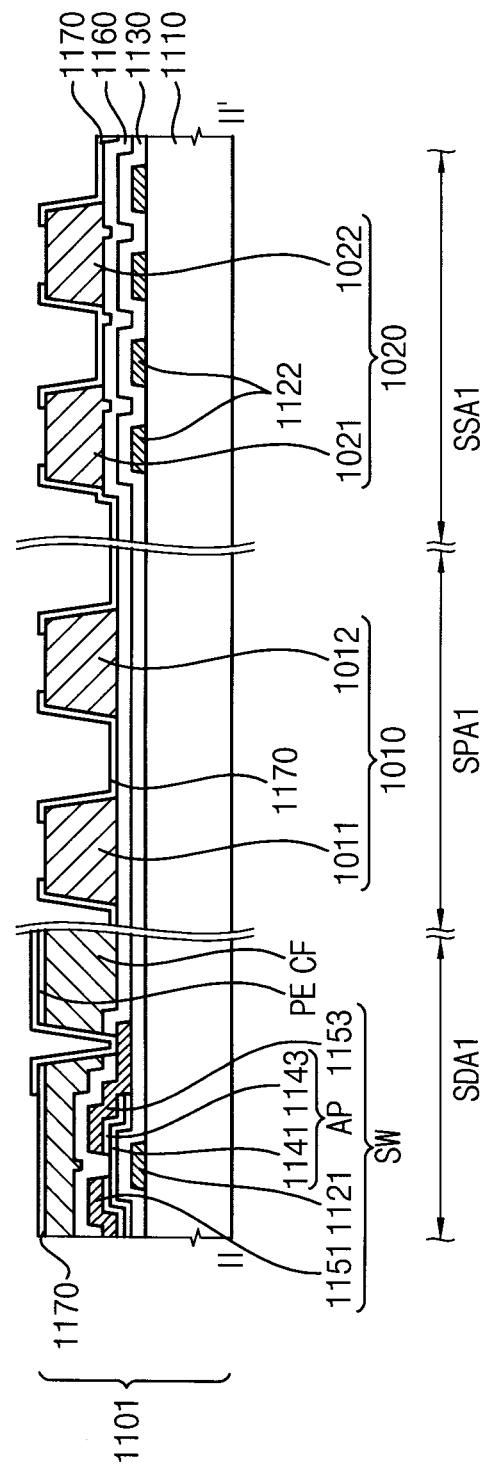

Referring to FIG. 23, a pixel electrode PE is formed on the first base substrate 1110 on which the third insulation layer 1170 is formed.

The pixel electrode PE is contacted with the drain electrode 1153 through a contact hole formed through the third insulation layer 1170, the color filter CF and the second insulation layer 1160. Thus, the pixel electrode PE is electrically connected to the switching element SW.

Figure 24:
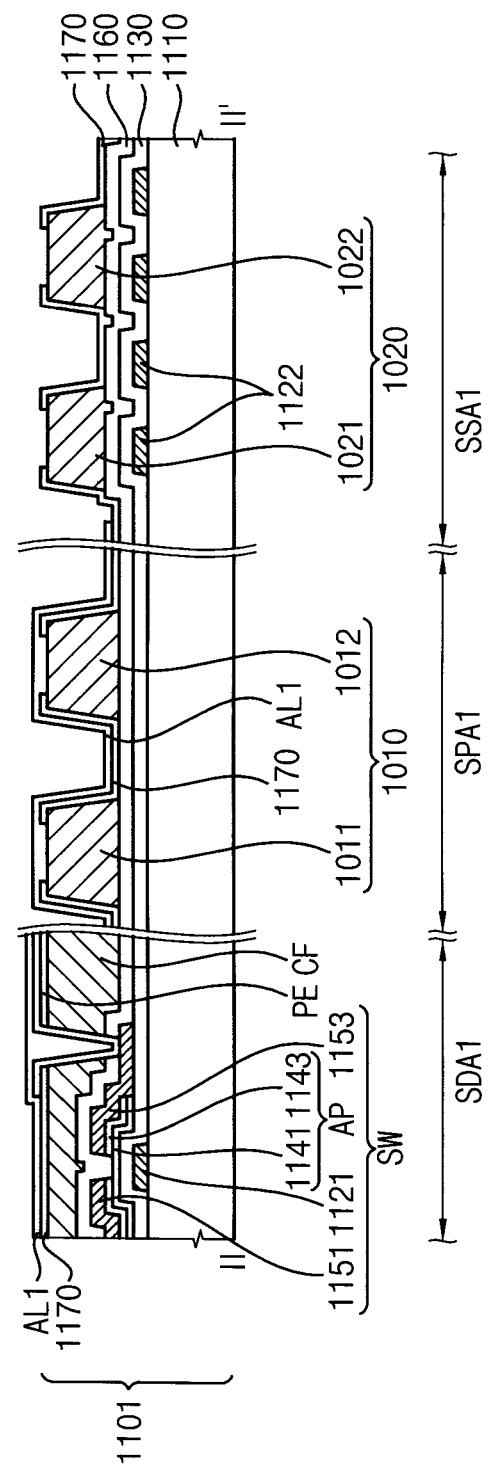

Referring to FIG. 24, a first alignment layer AL1 is formed on the first base substrate 1110 on which the pixel electrode PE is formed. The first alignment layer AL1 is formed in the first peripheral area SPA1 and the first display area SDA1. The first backflow-blocking pattern 1010 minimizes a rolling of the first alignment layer AL1 toward the first display area SDA1 from the first peripheral area SPA1, so that the first alignment layer AL1 may be uniformly formed in the first display area SDA1. Therefore, the first display substrate 1101, on which the first alignment layer AL1 is uniformly formed in the first display area SDA1, is manufactured.

Figure 25:
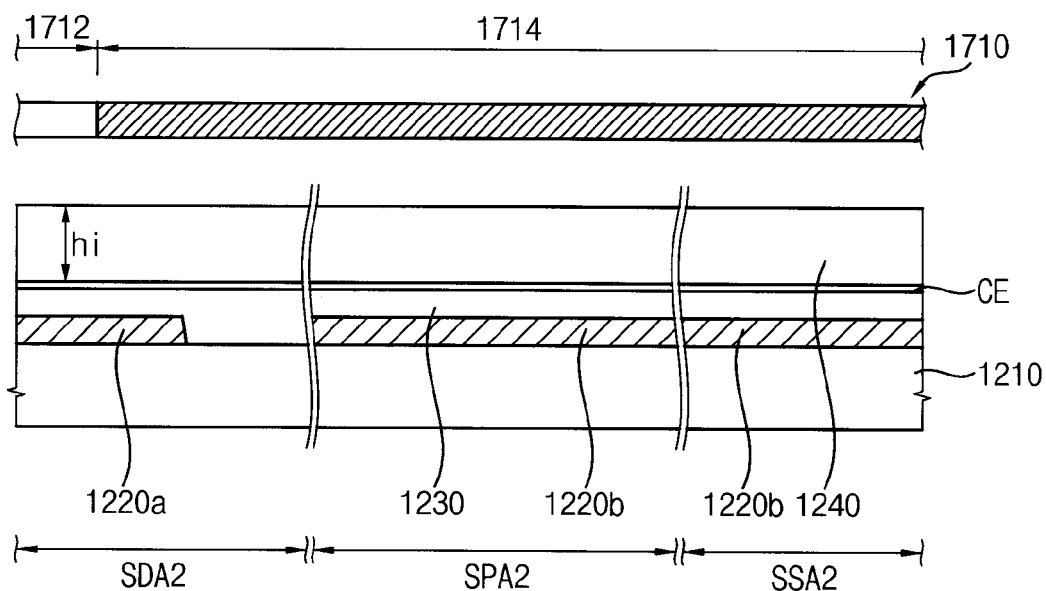
FIGS. 25 and 26 are cross-sectional views illustrating a method of manufacturing a second display substrate of FIG. 16.
Figure 26:
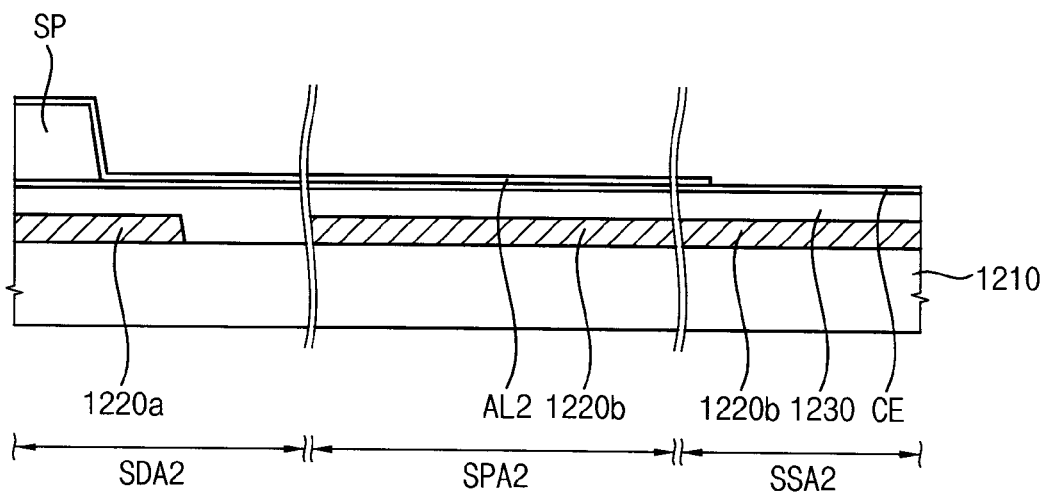

FIGS. 25 and 26 are cross-sectional views illustrating a method of manufacturing a second display substrate of FIG. 16.

Referring to FIG. 25, after the light-blocking pattern 1220a and 1220b is formed on the second base substrate 1210, the overcoating layer 1230 and the common electrode CE are sequentially formed on the second base substrate 1210 on which the light-blocking pattern 1220a and 1220b is formed.

A light-blocking layer is formed on the second base substrate 1210 and is patterned to form the light-blocking pattern 1220a and 1220b. The matrix portion 1220a of the light-blocking pattern 1220a and 1220b is formed in the second display area SDA2, and the outer portion 1220b is formed in the second peripheral area SPA2 and the second seal line area SSA2. Each of the overcoating layer 1230 and the common electrode CE is entirely formed on the second base substrate 1210 on which the light-blocking pattern 1220a and 1220b is formed.

A photo layer 1240 is formed on the second base substrate 1210 on which the common electrode CE is formed, and a mask 1710 is disposed over the photo layer 1240.

The photo layer 1240 includes an organic material having photosensitivity. The photo layer 1240 may include a negative-type photoresist layer which is hardened by light. A thickness hi of the photo layer 1240 may be larger than a height of the pixel spacer SP.

The mask 1710 includes a light-transmissive portion 1712 and a light-blocking portion 1714. The light-transmissive portion 1712 may correspond to a forming area of the pixel spacer SP in the second display area SDA2. The light-blocking portion 1714 may correspond to a remaining area except for the forming areas. When the light is provided to the mask 1710, the light passes through the light-transmissive portion 1712 to be provided to the photo layer 1240 and the light is blocked by the light-blocking portion 1714 not to be provided to the photo layer 1240.

Referring to FIG. 26, the photo layer 1240 receiving the light is developed to form the pixel spacer SP. The second alignment layer AL2 is formed on the second base substrate 1210 on which the pixel spacer SP is formed.

The second alignment layer AL2 is formed via jetting an ink including the raw material of the second alignment layer AL2 on the second base substrate 1210. The second alignment layer AL2 may be formed via additionally rubbing a coating layer coated by the raw material of the second alignment layer AL2 according to a liquid crystal mode of the liquid crystal layer 1300. The raw material of the second alignment layer AL2 may include a polyimide based compound and/or a polyamic acid based compound. Alternatively, the second alignment layer may be formed via rolling the raw material using a roller. Therefore, the second display substrate 1201, on which the second alignment layer AL2 is uniformly formed in the second display area SDA2, may be manufactured.

According to the present disclosure of inventive concept(s) as explained above, an insulation layer formed on a backflow-blocking pattern has one or more outgas holes. Thus, if a gas may be leaked through the hole formed on the backflow-blocking pattern and tested therefore before filling liquid crystal molecules, appropriate corrective actions can be taken. Therefore, portions in which the liquid crystal molecules are not filled up may be not generated.

The foregoing is illustrative of the present inventive concepts and is not to be construed as limiting thereof. Although a few exemplary embodiments of the present disclosure have been described, those skilled in the art will readily appreciate in view of the foregoing that many modifications are possible in the exemplary embodiments without materially departing from the novel teachings and advantages of the present disclosure of inventive concepts. Accordingly, all such modifications are intended to be included within the scope of the present teachings. In the claims, means-plus-function clauses are intended to cover the structures described herein as performing the recited function and not only structural equivalents but also functionally equivalent structures.

What is claimed is:

1. A display substrate comprising:
   a first display substrate comprising a display area having an array of switching elements and a non-display peripheral area outside of and adjacent to the display area;
   a second display substrate facing the first display substrate;
   a color filter disposed in the display area of the first display substrate;
   a first backflow-blocking pattern including a material substantially the same as that of the color filter and disposed in the peripheral area; and
   an insulation layer covering the color filter and the first backflow-blocking pattern, the insulation layer having a hole exposing, for outgassing therefrom, a portion of the first backflow-blocking pattern.

2. The display substrate of claim 1, wherein the color filter comprises:
   a first color filter pattern including a color photoresist material of a red pigment;
   a second color filter pattern including a color photoresist material of a green pigment; and
   a third color filter pattern including a color photoresist material of a blue pigment.

3. The display substrate of claim 2, wherein the first display substrate further comprises a seal-line area surrounding the peripheral area, and further comprising:
   a second backflow-blocking pattern disposed in the seal-line area.

4. The display substrate of claim 3, wherein the first backflow-blocking pattern and the second backflow-blocking pattern include a material substantially the same as that included in the color filter.

5. The display substrate of claim 4, wherein a width of the hole is smaller than a width of the first backflow-blocking pattern and a width of the second backflow-blocking pattern.

6. The display substrate of claim 4, wherein the first backflow-blocking pattern has a closed curve shape surrounding the display area, and
   the second backflow-blocking pattern has a closed curve shape surrounding the peripheral area.

7. The display substrate of claim 3, wherein the first backflow-blocking pattern and the second backflow-blocking pattern comprise:
   a first sub backflow-blocking pattern; and
   a second sub backflow-blocking pattern parallel to the first sub backflow-blocking pattern.

8. The display substrate of claim 7, wherein the first sub backflow-blocking pattern includes a material substantially the same as that included in the first color filter pattern, and the second sub backflow-blocking pattern includes a material substantially the same as that included in the third color filter pattern.

9. The display substrate of claim 8, wherein a width of the hole is smaller than a width of the first sub backflow-blocking pattern and a width of the second sub backflow-blocking pattern.

10. The display substrate of claim 1, wherein the first display substrate further comprises:
    a pixel electrode disposed on the color filter and electrically connected to the switching element.

11. The display substrate of claim 10, further comprising an alignment layer disposed on the pixel electrode.

12. The display substrate of claim 1, wherein the second display substrate further comprises a peripheral area surrounding a display area, and further comprising:

a light-blocking member disposed on the display area and the peripheral area of the second display substrate to block light.

13. A method of manufacturing a display substrate, the method comprising:

forming an array of switching elements on a display area of a base substrate;

forming a color filter disposed on the array of the switching elements and a first backflow-blocking pattern disposed in a peripheral area outside and adjacent to the display area, the first backflow-blocking pattern including a material substantially the same as that of the color filter;

forming an insulation layer covering the first backflow-blocking pattern, the insulation layer having one or more holes exposing, for outgassing purposes, corresponding portions of the first backflow-blocking pattern; and forming a pixel electrode on the insulation layer.

14. The method of claim 13, wherein the forming the color filter comprises:

forming a first color filter pattern including a color photoresist material of a red pigment;

forming a second color filter pattern including a color photoresist material of a green pigment; and forming a third color filter pattern including a color photoresist material of a blue pigment.

15. The method of claim 14, wherein the base substrate further comprises a seal-line area surrounding the peripheral area, and further comprising:

forming a second backflow-blocking pattern on the seal-line area.

16. The method of claim 15, wherein the first backflow-blocking pattern has a closed curve pattern surrounding the display area, and the second backflow-blocking pattern has a closed curve shape surrounding the peripheral area.

17. The method of claim 15, wherein the first backflow-blocking pattern and the second backflow-blocking pattern comprise:

a first sub backflow-blocking pattern; and a second sub backflow-blocking pattern parallel to the first sub backflow-blocking pattern.

18. The method of claim 17, wherein the second sub backflow-blocking pattern includes a material substantially the same as the third color filter pattern.

19. The method of claim 17, wherein a width of the hole is smaller than a width of the first sub backflow-blocking pattern and a width of the second sub backflow-blocking pattern.

20. The method of claim 13, further comprising forming an alignment layer on the pixel electrode.

\* \* \* \* \*